(12) United States Patent
Fujiike et al.

(10) Patent No.: US 6,329,108 B1
(45) Date of Patent: Dec. 11, 2001

(54) COLOR-FILTER MANUFACTURING METHOD

(75) Inventors: Hiroshi Fujiike, Yokohama; Tetsuo Okabe; Makoto Akahira, both of Kawasaki; Satoshi Wada, Machida; Yoshitomo Marumoto, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/121,688

(22) Filed: Jul. 24, 1998

(30) Foreign Application Priority Data

Jul. 28, 1997 (JP) .................................................. 9-201897
Jun. 30, 1998 (JP) ................................................ 10-185013

(51) Int. Cl.⁷ ............................ G02B 5/20; G02F 1/1335
(52) U.S. Cl. ............................... 430/7; 347/106; 347/107
(58) Field of Search ............................... 430/7; 347/106, 347/107; 349/106

(56) References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |

FOREIGN PATENT DOCUMENTS

| | | |
|---|---|---|
| 0 461 759 | 12/1991 | (EP) . |
| 0 675 384 | 10/1995 | (EP) . |
| 0 683 406 | 11/1995 | (EP) . |
| 0 753 766 | 1/1997 | (EP) . |
| 0 791 841 * | 8/1997 | (EP) . |
| 54-56847 | 5/1979 | (JP) . |
| 59-75205 | 4/1984 | (JP) . |
| 59-123670 | 7/1984 | (JP) . |
| 59-138461 | 8/1984 | (JP) . |
| 60-71260 | 4/1985 | (JP) . |
| 8-240803 | 9/1996 | (JP) . |
| 10-39130 | 2/1998 | (JP) . |

* cited by examiner

Primary Examiner—John A. McPherson
(74) Attorney, Agent, or Firm—Fitzpatrick, Cella, Harper & Scinto

(57) ABSTRACT

A color-filter manufacturing method for manufacturing a color filter, with very little color unevenness, in a short period of time. According to the method, at least a single color of red, green and blue ink is discharged onto each pixel of a substrate by using an ink-jet head, and coloring is performed such that color density fluctuation among pixels colored in red is kept 5% or lower, color density fluctuation among pixels colored in green is kept 10% or lower, and color density fluctuation among pixels colored in blue is kept 3% or lower.

28 Claims, 20 Drawing Sheets

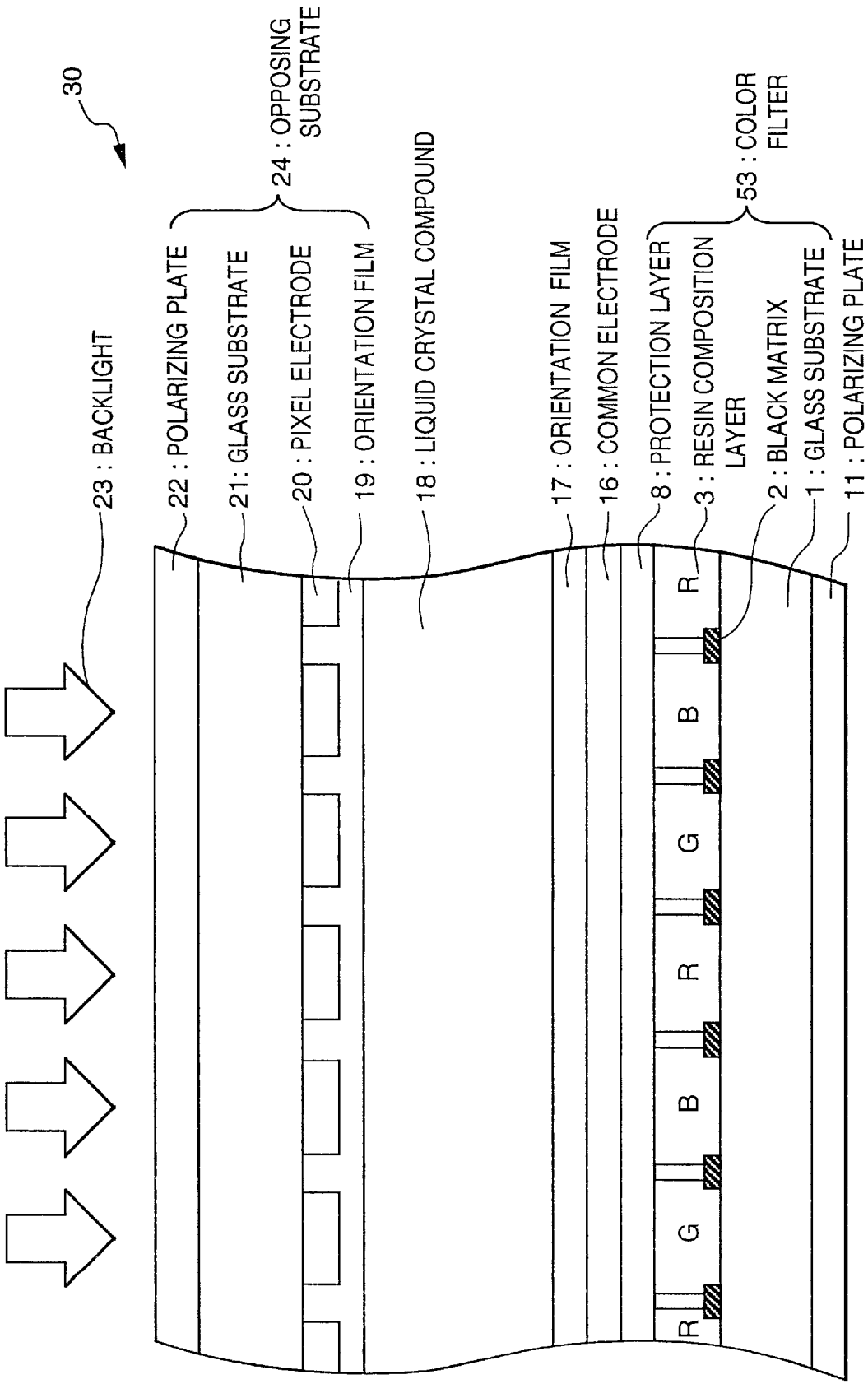

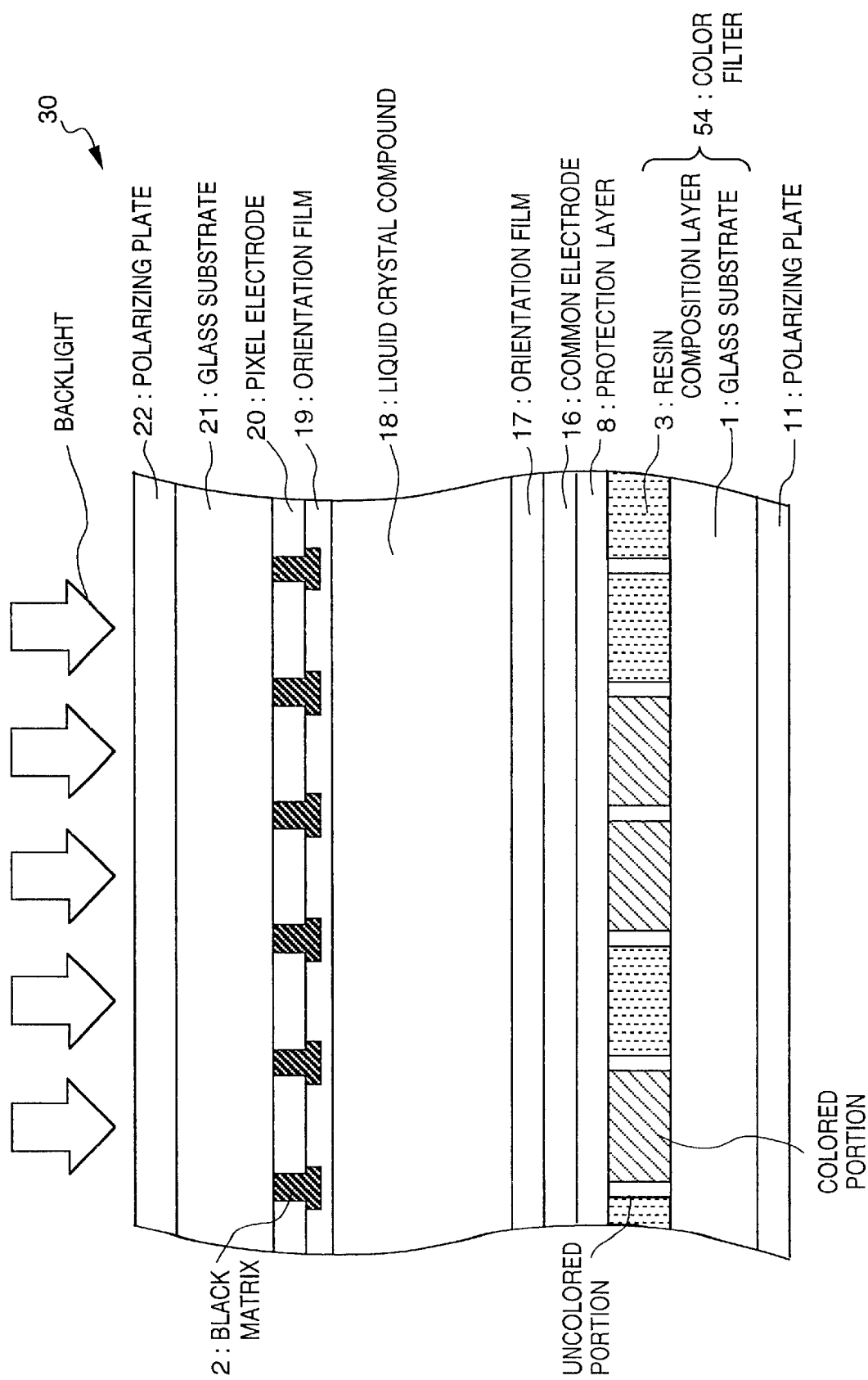

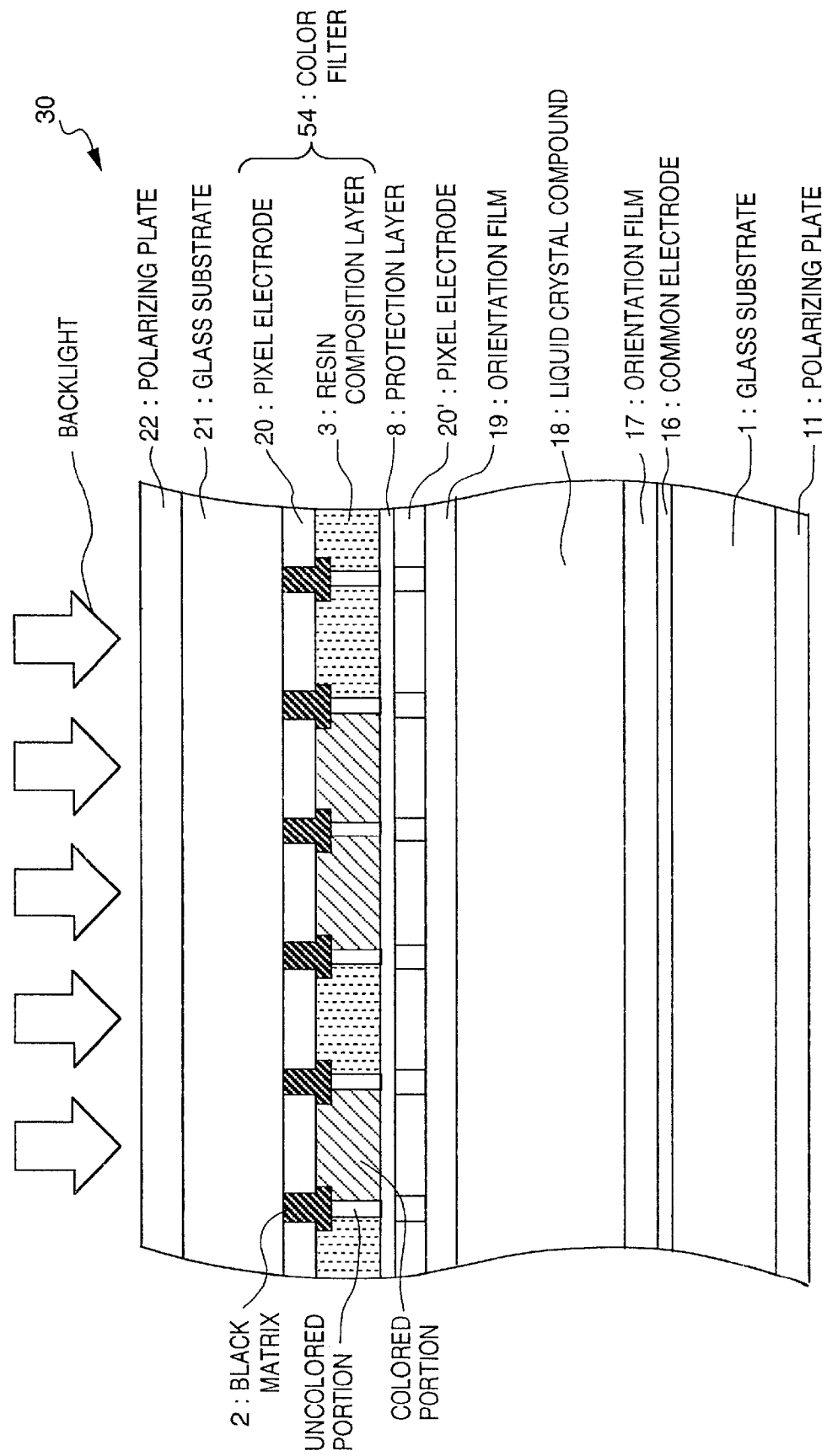

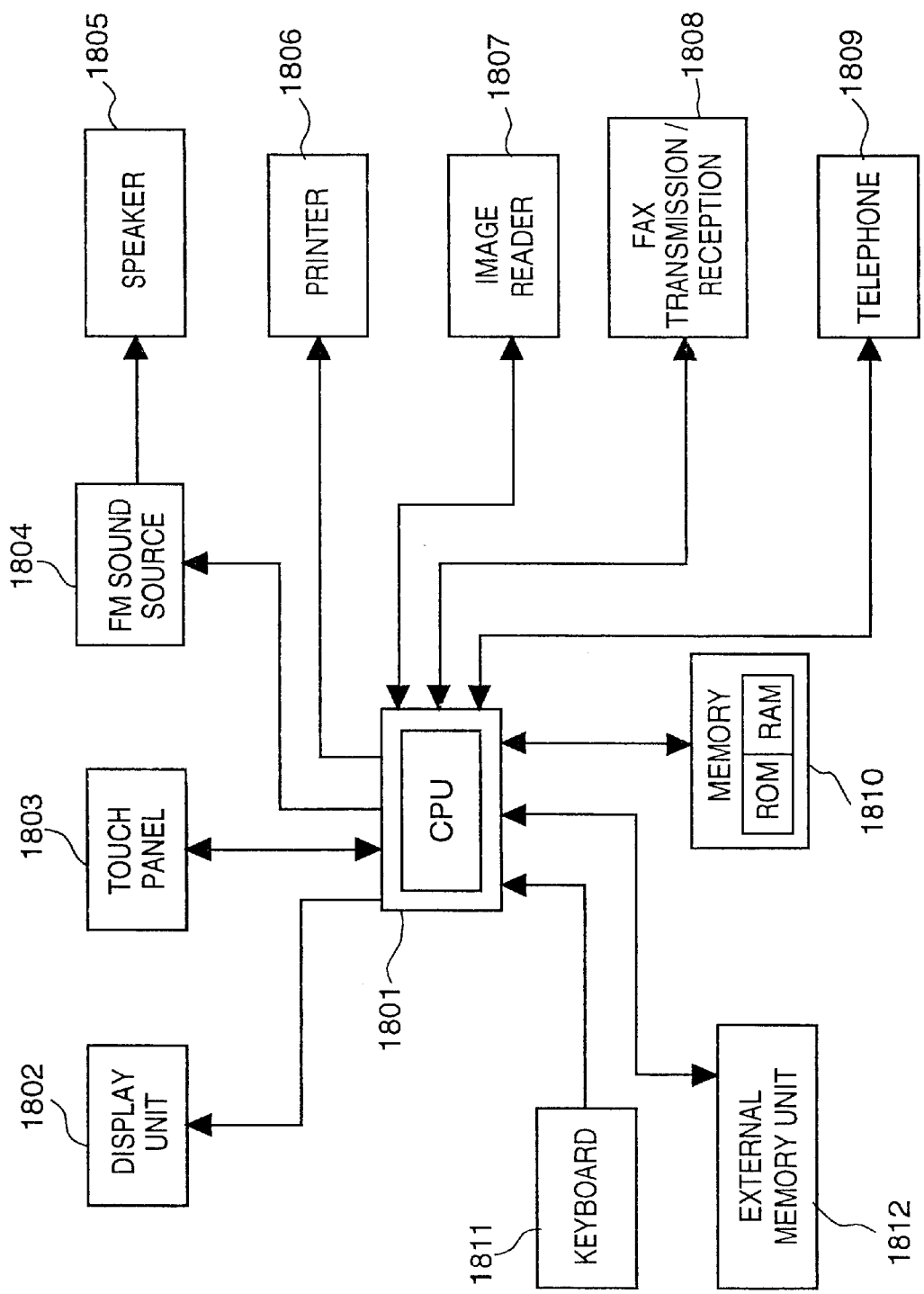

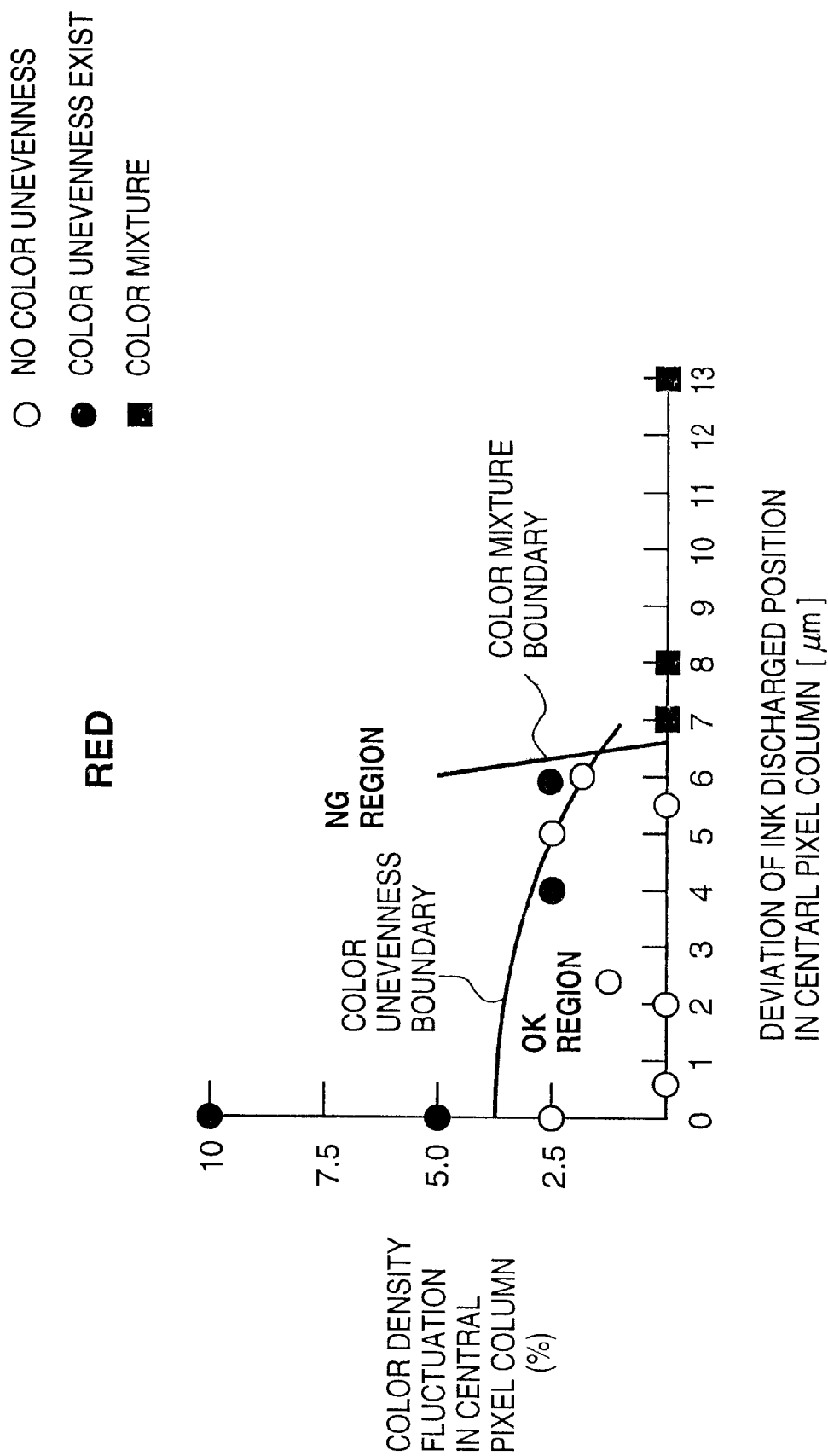

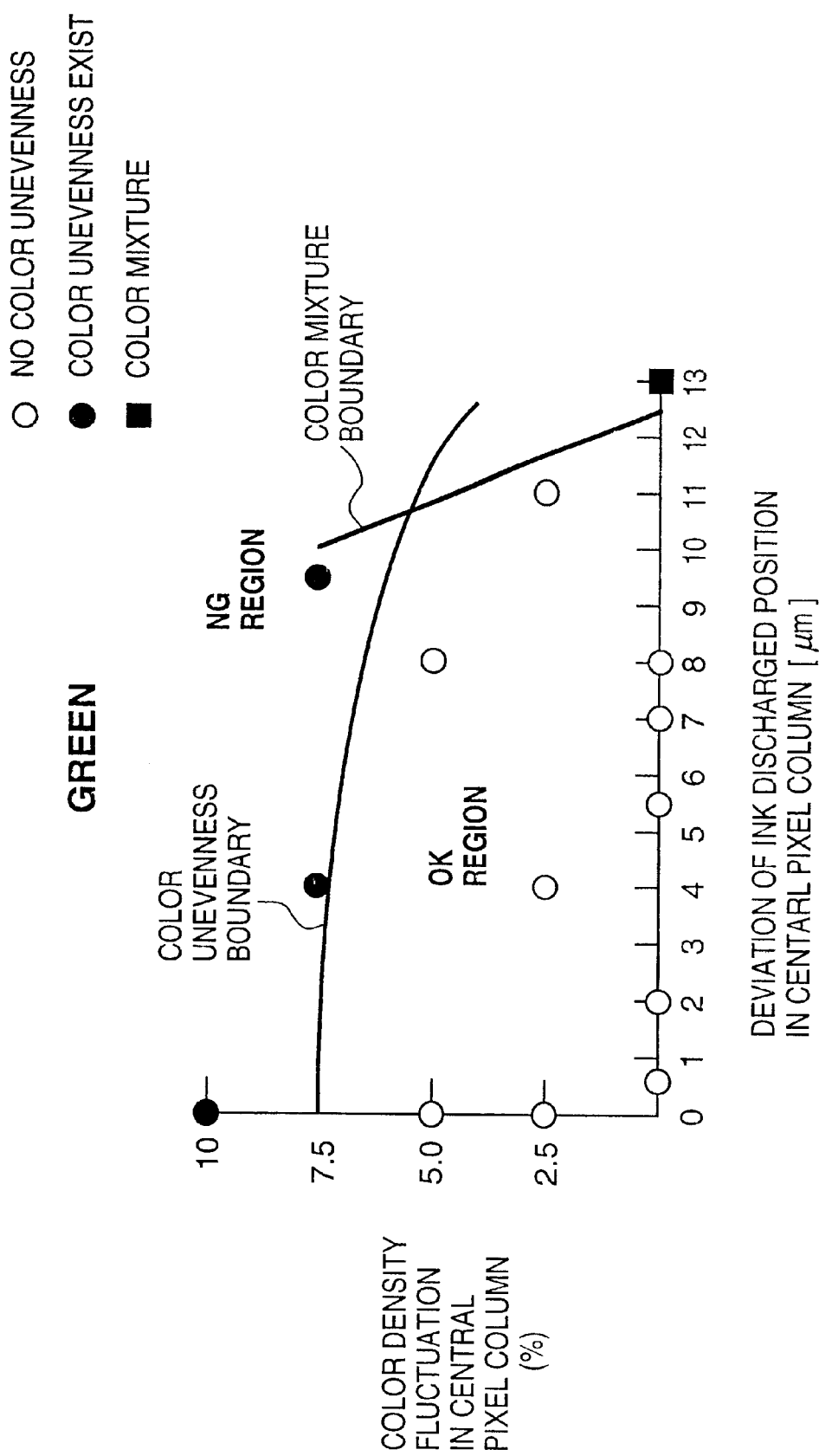

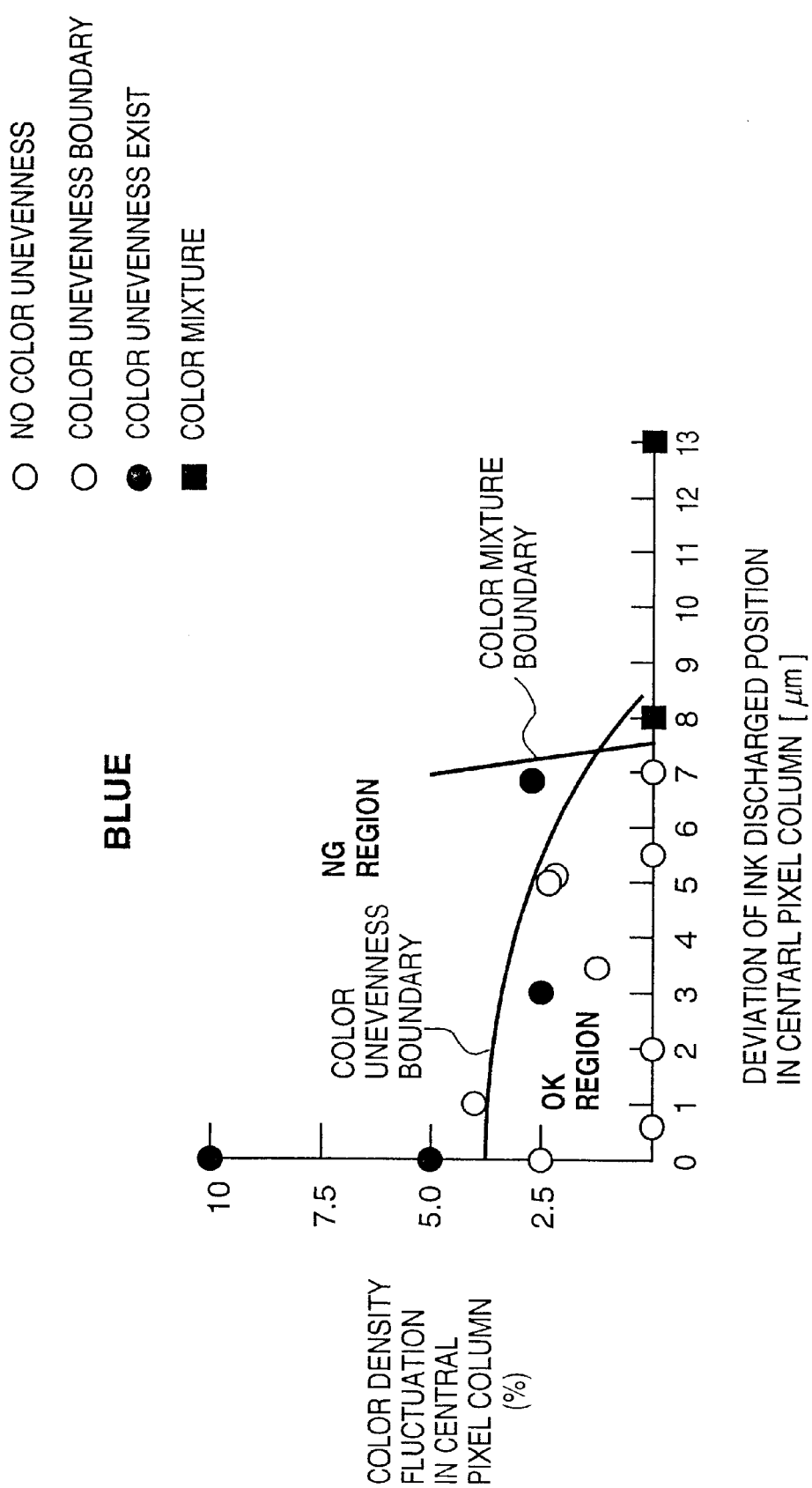

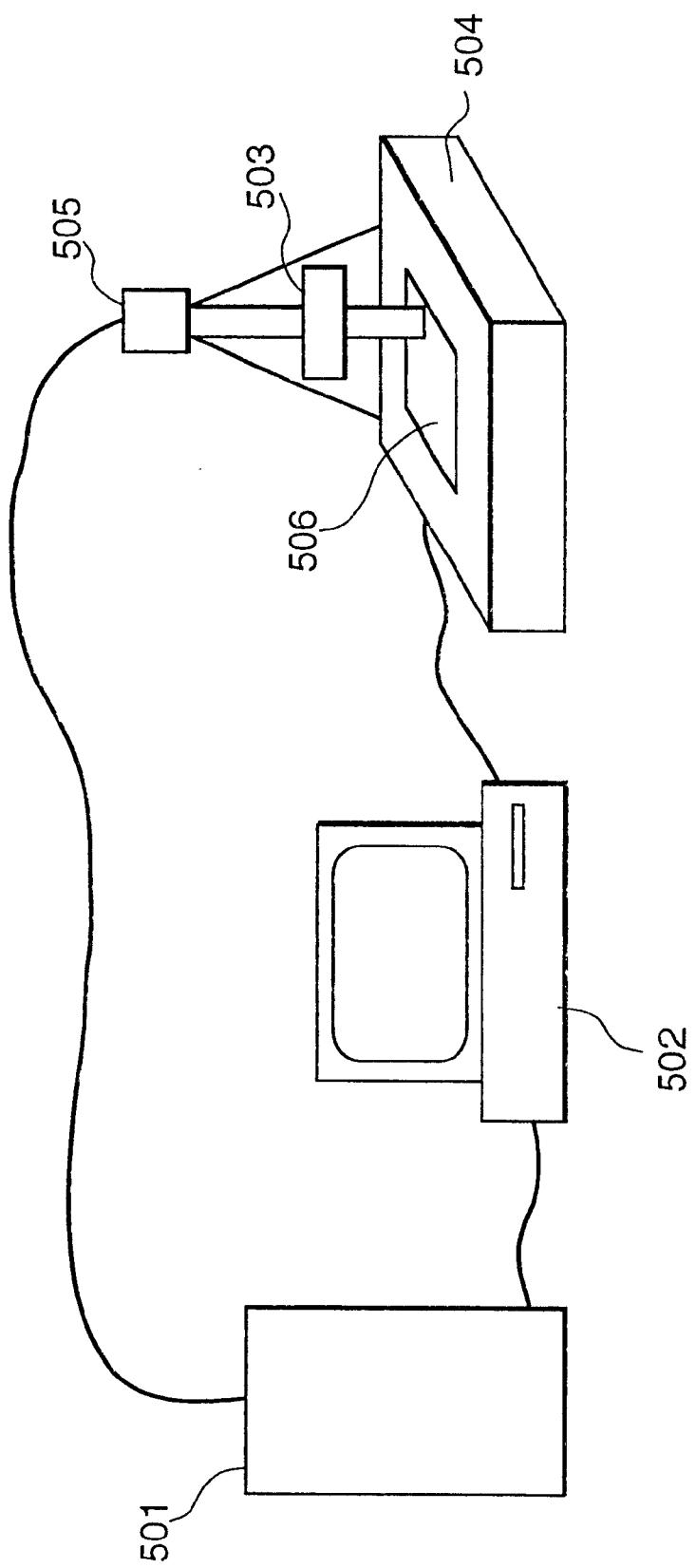

COLOR-FILTER MANUFACTURING METHOD

BACKGROUND OF THE INVENTION

The present invention relates to a color-filter manufacturing method of manufacturing a color filter by discharging ink to a color-subject material with the use of an ink-jet head, a color filter, display apparatus and an apparatus including the display apparatus.

Generally, a liquid crystal display apparatus is used in a personal computer, word processor, pachinko (Japanese pinball game) table, automobile navigation system, small-sized television set and the like, and its demands are increasing recently. However, since the price of a liquid crystal display apparatus is high, the need for cost reduction is increasing every year for a liquid crystal display apparatus.

A color filter which constitutes a liquid crystal display apparatus includes columns of pixels in red (R), green (G) and blue (B), arrayed on a transparent substrate. In the periphery of each of these pixels, a black matrix for shielding light is provided in order to enhance displaying contrast.

The conventionally known methods of manufacturing a color filter are: pigment dispersion method, dyeing method, electrodeposition method and print method.

In the pigment dispersion method, a pigment-dispersed photosensitive resin layer is formed on a substrate and patterned into a single-color pattern. This process is repeated three times to obtain R, G, and B color filter layers.

In the dyeing method, a water-soluble polymer material as a dyeable material is applied onto a glass substrate, and the coating is patterned into a desired shape by a photolithographic process. The obtained pattern is dipped in a dye bath to obtain a colored pattern. This process is repeated three times to form R, G, and B color filter layers.

In the electrodeposition method, a transparent electrode is patterned on a substrate, and the resultant structure is dipped in an electrodeposition coating fluid containing a pigment, a resin, an electrolyte, and the like to be colored in the first color by electrodeposition. This process is repeated three times to form R, G, and B color filter layers. Finally, these layers are calcined.

In the print method, a pigment is dispersed in a thermosetting resin, a print operation is performed three times to form R, G, and B coatings separately, and the resins are thermoset, thereby forming colored layers. In all of the above methods, a protective layer is generally formed on the colored layers.

The point common to these four methods is that the same process must be repeated three times to obtain layers colored in three colors, i.e., R, G, and B. Because of the large number of processing steps, these methods have disadvantages such as decreased yield and increased cost.

Furthermore, in the electrodeposition method, limitations are imposed on pattern shapes which can be formed. For this reason, with the existing techniques, it is difficult to apply this method to TFTs. Moreover, in the print method, a pattern with a fine pitch is difficult to form because of poor resolution.

In order to eliminate these drawbacks, there is a proposed technique in which a pattern of a color filter is formed by discharging ink onto a glass substrate by using an ink-jet head.

Regarding such ink-jet method, for instance, Japanese Patent Application Laid-Open No. 59-75205 discloses a technique where ink having three colors of pigment (R, G and B) is discharged on a substrate by ink-jet method and each ink is dried to form a colored image portion. Such ink-jet method enables to form pixels colored in R, G and B all at once. Therefore, the manufacturing process can be greatly simplified and large cost-down effect can be attained.

However, when a color filter is manufactured by the ink-jet method, a problem arises in that, in a case where each of the pixels in one column or one row of screen surface is serially colored by single scanning operation as shown in FIG. 11, color unevenness is generated in the screen.

It is considered that such color unevenness generated in the screen is caused by the following various factors related to non-uniform ink discharge.

(1) Fluctuation in the amount of ink discharged per single discharge operation;
(2) Fluctuation in the diameter of ink discharged and spread on the substrate; and
(3) Fluctuation in the positional relation of ink, spread on the substrate, with respect to the pixel.

Among the above three factors, factor (1) is recognized as color unevenness because color density of each pixel is different. Factors (2) and (3) are recognized as color unevenness because when macroscopically viewed, the color density of each pixel is viewed differently due to the non-uniform coloring of each pixel.

The reason that such fluctuation is viewed as color unevenness is described below with reference to FIG. 17.

FIG. 17 shows pixels of a color filter and absorbance distribution on the cross section of the pixels (to simplify the description, a single-colored color filter is shown).

In FIG. 17, pixel 1 has absorbance distribution of a pixel equivalent to that of pixels 2, 4 and 5. However, absorbance of pixel 1 is lower than that of pixels 2, 4 and 5. This is caused by the aforementioned factor (1). Meanwhile in pixel 3, the discharged positions are offset to the left. Therefore, although pixel 3 has the average absorbance equal to that of pixels 2, 4 and 5, distribution is different. This is caused by the aforementioned factors (2) and (3). In this example, since the right side of pixel 3 appears light, human eyes recognize pixel 3 lighter than pixels 2, 4 and 5. Therefore, this may be viewed as color unevenness.

Such non-uniformity of ink discharge exists not only in a single nozzle but also exists amongst plural nozzles.

Therefore, when a plurality of nozzles are used to speed up the coloring process, the above problem becomes particularly significant.

To cope with this problem, Japanese Patent Application Laid-Open No. 8-240803 proposes a method of dispersing the non-uniformity by setting limitation to the coloring order of pixels.

However, since such method constrains the coloring order of pixels, a problem arises in that it is difficult to reduce time required for coloring processes.

SUMMARY OF THE INVENTION

The present invention is made in consideration of the above situation, and has as its object to provide a color-filter manufacturing method for manufacturing a color filter, which has very little color unevenness, in a short period of time.

Another object of the present invention is to provide a display apparatus including a color filter manufactured by the above manufacturing method, and an apparatus incorporating the display apparatus.

In order to solve the above-described problems and attain the above objects, the color-filter manufacturing method according to the first aspect of the present invention is a color-filter manufacturing method for manufacturing a color filter by discharging at least a single color of red, green and blue ink, onto a color-subject material by using an ink-jet head, for coloring each pixel of the color-subject material, characterized in that coloring is performed such that color density fluctuation among pixels colored in red is kept 5% or lower, color density fluctuation among pixels colored in green is kept 10% or lower, and color density fluctuation among pixels colored in blue is kept 3% or lower.

Moreover, a color filter according to the first aspect of the present invention is a color filter manufactured by coloring each pixel of a color-subject material by discharging at least a single color of red, green and blue ink, onto the color-subject material by using an ink-jet head, characterized in that coloring is performed such that color density fluctuation among pixels colored in red is kept 5% or lower, color density fluctuation among pixels colored in green is kept 10% or lower, and color density fluctuation among pixels colored in blue is kept 3% or lower.

Furthermore, a display apparatus according to the first aspect of the present invention is a display apparatus integrally comprising: light-amount changing means for enabling to change an amount of light; and a color filter manufactured by coloring each pixel of a color-subject material by discharging at least a single color of red, green and blue ink, onto the color-subject material by using an ink-jet head, characterized in that coloring is performed such that color density fluctuation among pixels colored in red is kept 5% or lower, color density fluctuation among pixels colored in green is kept 10% or lower, and color density fluctuation among pixels colored in blue is kept 3% or lower.

Further, an apparatus according to the first aspect of the present invention is an apparatus having a display device which includes a color filter manufactured by discharging at least a single color of red, green and blue ink, onto a color-subject material by using an ink-jet head, for coloring each pixel of the color-subject material, comprising image-signal supplying means for supplying an image signal to the display device, the display device integrally comprising: the color filter manufactured by coloring such that color density fluctuation among pixels colored in red is kept 5% or lower, color density fluctuation among pixels colored in green is kept 10% or lower, and color density fluctuation among pixels colored in blue is kept 3% or lower; and light-amount changing means for enabling to change an amount of light.

Still further, a color-filter manufacturing method according to the second aspect of the present invention is a color-filter manufacturing method for coloring a color-subject material, by measuring color density of the color-subject material, while changing the number of times of measurement or frequency of measurement in accordance with a color of pixel, and by using the result of measurement, coloring is performed such that color density fluctuation among pixels colored in red is kept 5% or lower, color density fluctuation among pixels colored in green is kept 10% or lower, and color density fluctuation among pixels colored in blue is kept 3% or lower.

Furthermore, a color-filter manufacturing method according to the third aspect of the present invention is a color-filter manufacturing method for coloring a color-subject material, by measuring color density of the color-subject material, while changing the number of times of measurement or frequency of measurement in accordance with a color of pixel, and by using the result of measurement, coloring is performed such that fluctuation of an ink amount per unit area in a colored portion of the color-subject material is kept 5% or lower in a case of a red pixel, 10% or lower in a case of a green pixel and 3% or lower in a case of a blue pixel.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a cross-sectional view showing an example of a basic structure of a color liquid crystal display apparatus incorporating the color filter according to the present embodiment;

FIG. 6 is a cross-sectional view showing another example of a basic structure of a color liquid crystal display apparatus incorporating the color filter according to the present embodiment;

FIG. 7 is a cross-sectional view showing another example of a basic structure of a color liquid crystal display apparatus incorporating the color filter according to the present embodiment;

FIG. 8 is a block diagram showing an information processing apparatus, to which the liquid crystal display device is applied;

FIGS. 13A to 13C are graphs showing the relations of color unevenness, color density and discharge deviation;

FIG. 14 is a schematic view showing a color density measuring apparatus;

DETAILED DESCRIPTION OF THE PREFERRED EMBODIMENT

Preferred embodiment of the present invention will be described in detail in accordance with the accompanying drawings.

Note that a color filter defined in the present embodiment includes a coloring portion and a color-subject material, and in the coloring filter, inputted light is outputted with a changed characteristic.

Figure 1:
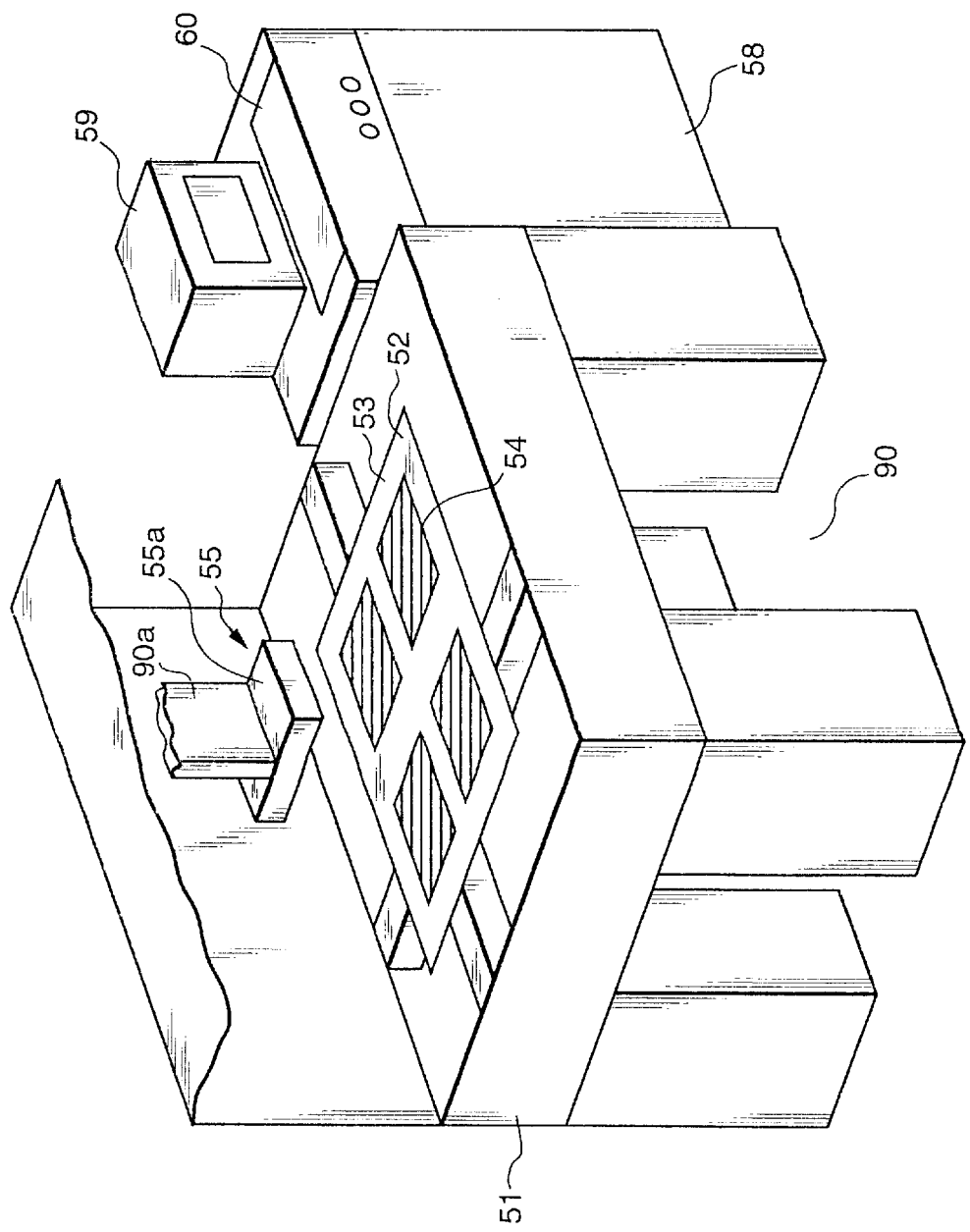
FIG. 1 is a perspective view showing a structure of a color-filter manufacturing apparatus as one of embodiment of the present invention.

FIG. 1 is a perspective view showing the structure of a color-filter manufacturing apparatus in the state of coloring processing employing the ink-jet printing method.

In FIG. 1, reference numeral 51 denotes a platform of the apparatus; 52, an XY θ stage provided on the platform 51; 53, a color-filter substrate set on the XY θ stage 52; 54, a color filter formed on the color-filter substrate 53; 55, a head unit including R (red), G (green) and B (blue) ink-jet heads for coloring the color filter 54 and a head mount 55a supporting the ink-jet heads; 58, a controller which controls the overall operation of a color-filter manufacturing apparatus 90; 59, a display unit of the controller 58; and 60, a keyboard as an operation unit of the controller 59.

The head unit 55 is detachably mounted to a supporting portion 90a of a color-filter manufacturing apparatus 90, with an adjustable rotation angle with respect to the horizontal surface direction.

Figure 2:
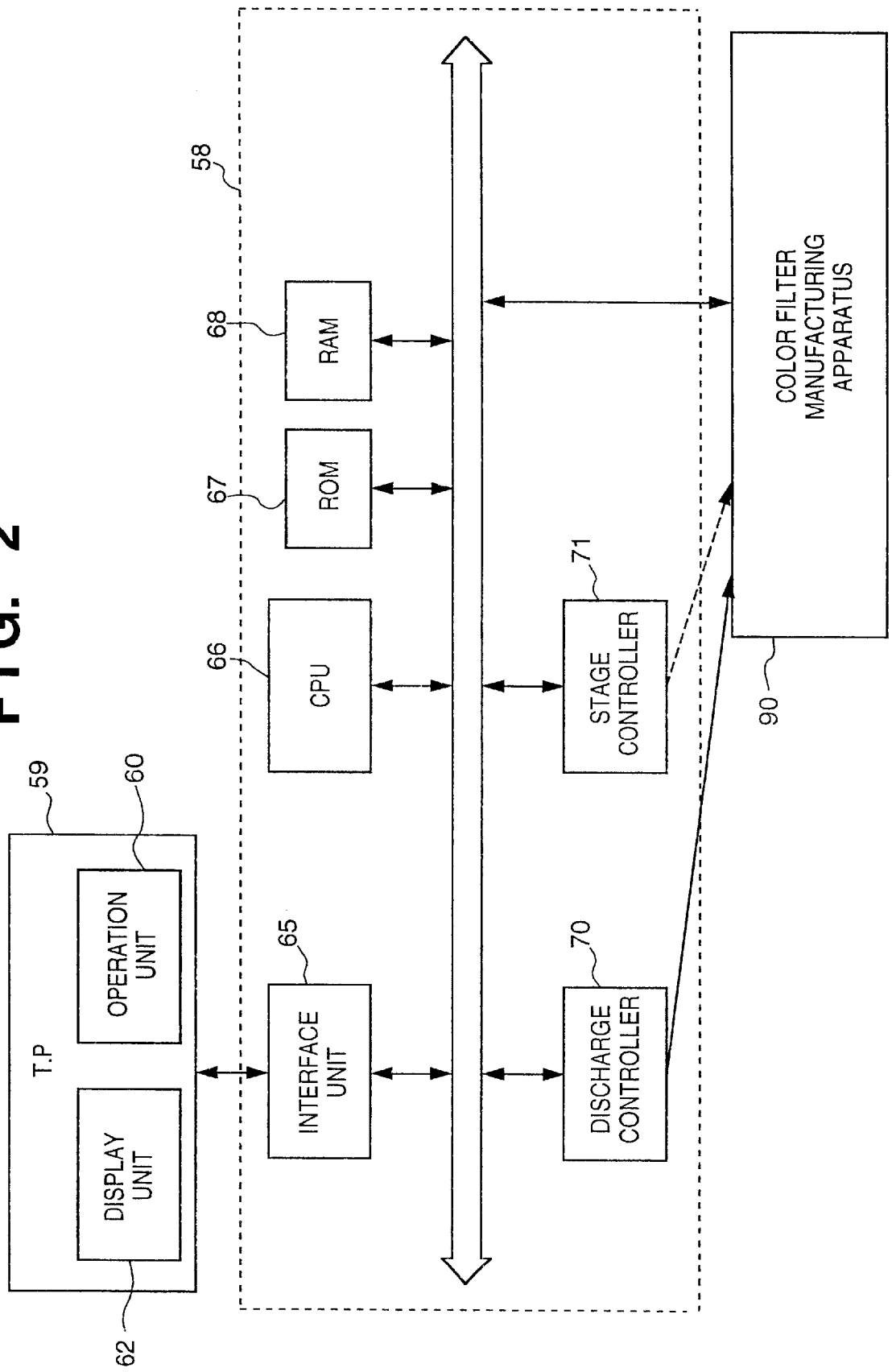
FIG. 2 is a block diagram showing a construction of a controller which controls operation of the color-filter manufacturing apparatus.

FIG. 2 is a block diagram showing the construction of a controller which controls the operation of the color-filter manufacturing apparatus 90. In FIG. 2, the teaching pendant 59 serves as input/output means of the controller 58. Numeral 62 denotes a display unit which displays information on the progress of manufacturing process, presence/absence of abnormality of the ink-jet head and the like. Reference numeral 60 denotes an operation unit (keyboard) for instructing the operation and the like of the color-filter manufacturing apparatus 90.

Reference numeral 58 denotes a controller which controls the overall operation of the color-filter manufacturing apparatus 90; 65, an interface unit for receiving/sending data with the teaching pendant 59; 66, a CPU which controls the color-filter manufacturing apparatus 90; 67, a ROM in which control programs for operating the CPU 66 are stored; 68, a RAM in which abnormal information and the like are stored; 70, a discharge controller which controls ink discharge to respective pixels of a color filter; 71, a stage controller which controls the operation of the XY θ stage 52. The color-filter manufacturing apparatus 90 is connected to the controller 58, and operates in accordance with instructions from the controller 58.

Figure 3:
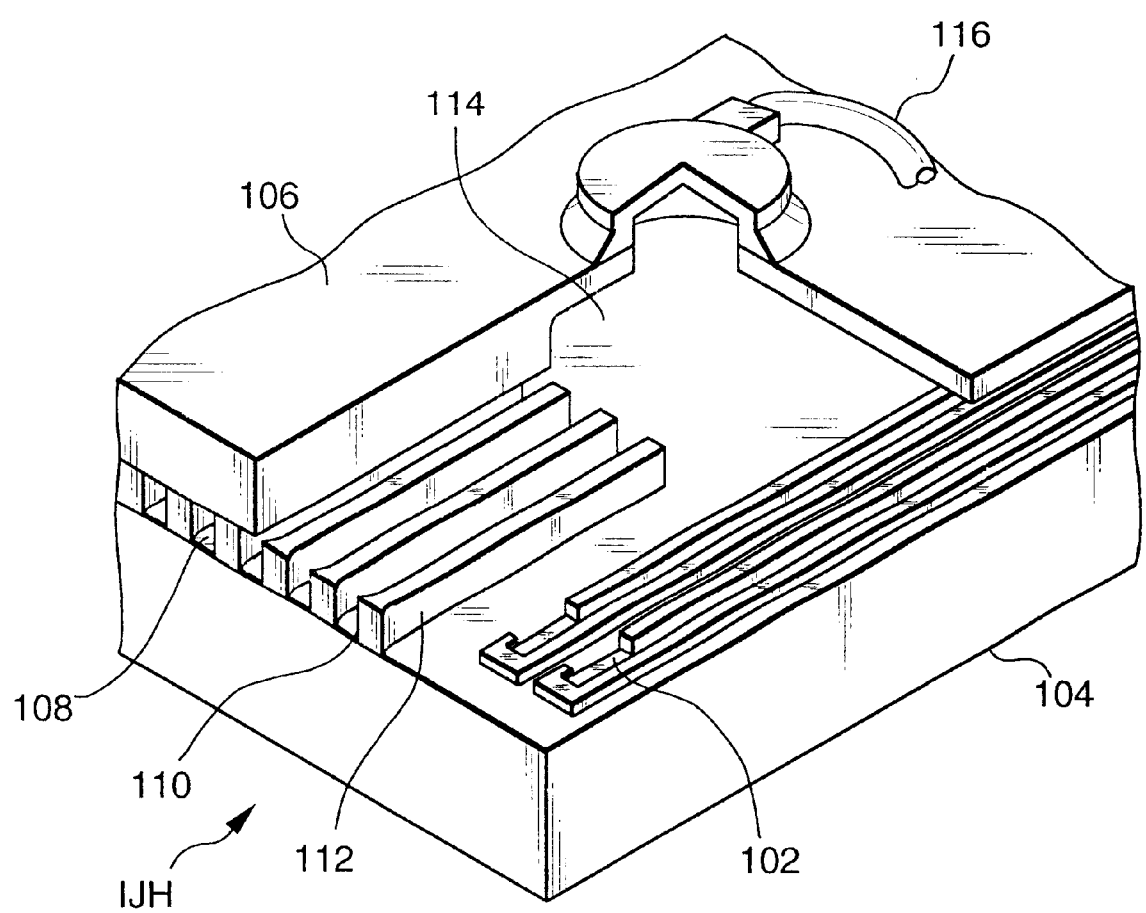
FIG. 3 is a perspective view showing the structure of an ink-jet head used in the color-filter manufacturing apparatus.

FIG. 3 is a perspective view showing the structure of the ink-jet head IJH used in the above color-filter manufacturing apparatus 90. In FIG. 1, three ink-jet heads IJH are provided in correspondence to the three, R, G and B colors, however, as the three heads have the same structure, FIG. 3 shows the structure of one of these heads.

In FIG. 3, the ink-jet head IJH mainly comprises a heater board 104 as a base plate on which a plurality of heaters 102 are formed, and a top plate 106 placed on the heater board 104. A plurality of discharge orifices 108 are formed on the top plate 106, and tunnel-like liquid channels 110 connected to the discharge orifices 108 are formed at the rear of the discharge orifices 108. The respective liquid channels 110 are separated from each other by partition walls 112. The liquid channels 110 are connected to a common ink chamber 114 at the rear of the liquid channels. Ink is supplied to the ink chamber 114 via an ink supply port 116, and the ink is supplied from the ink chamber 114 to the respective liquid channels 110.

The heater board 104 and the top plate 106 are assembled such that the respective heaters 102 are positioned correspondingly to the respective liquid channels 110, as shown in FIG. 3. Although FIG. 3 only shows two heaters 102, the heaters 102 are respectively provided in correspondence to the respective liquid channels 110. In the assembled state as shown in FIG. 3, when a predetermined drive pulse is applied to the heaters 102, the ink on the heaters 102 is boiled to form bubbles, and the ink is pressed due to volume expansion of the bubbles and discharged from the discharge orifices 108. Accordingly, the size of the bubbles can be controlled by controlling the drive pulse, e.g., the level of electric power, applied to the heaters 102. Thus, the volume of the ink discharged from the discharge orifices can be freely controlled.

FIGS. 4A to 4F are cross-sectional views showing an example of a color-filter manufacturing process.

It is preferable to use a transparent substrate for the color filter in the present embodiment. Although a glass substrate is generally used in the present embodiment, it is not limited to a glass substrate as long as the substrate has necessary characteristics to be used as a liquid crystal color filter e.g. transparency, mechanical strength and the like.

Figure 4A:
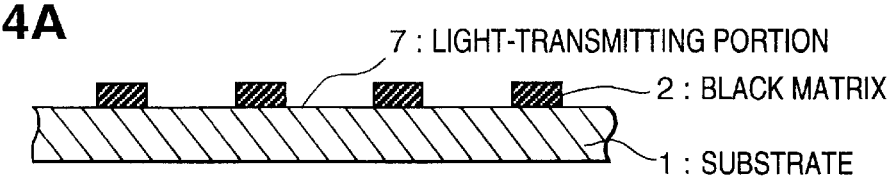
FIGS. 4A to 4F are cross-sectional views showing a color-filter manufacturing process.
Figure 4B:
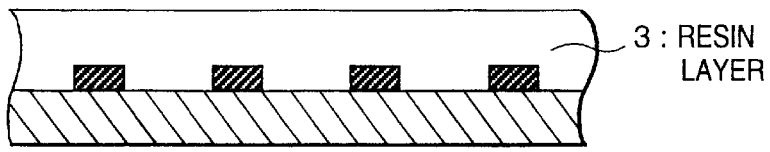

FIG. 4A shows the glass substrate 1 having a light-transmitting portion 7 and a black matrix 2 as a light-shielding portion. First, resin composition, which is set by irradiation of light or a combination of irradiation of light and heating, and which has ink acceptability, is coated on the substrate 1 on which the black matrix 2 is formed, and prebaking is performed in accordance with necessity to form a resin layer 3 (FIG. 4B). The resin layer 3 can be formed by various coating methods such as spin coating, roll coating, bar coating, spray coating and dip coating, and the formation of the resin layer 3 is not limited to any specific method.

Figure 4C:
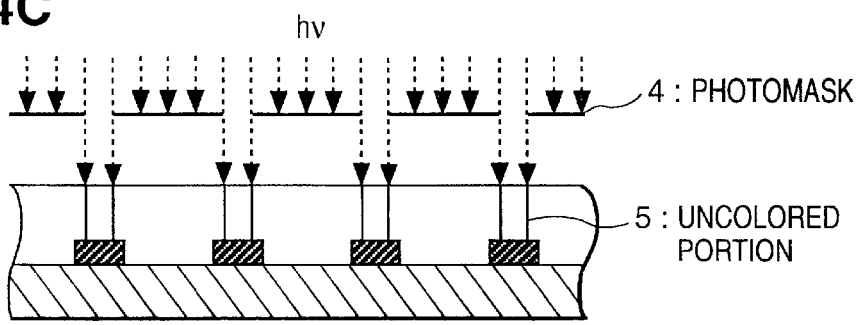
Figure 4D:
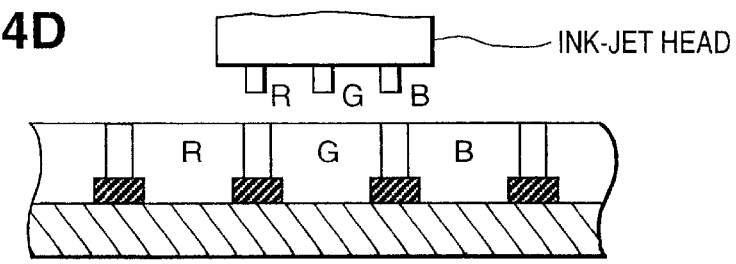
Figure 4E:
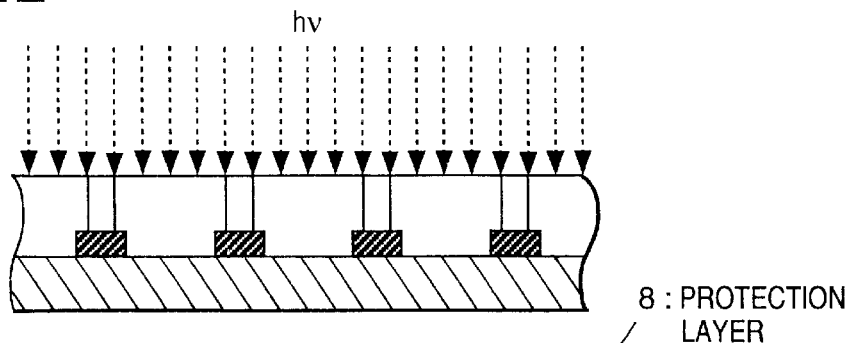

Next, a part of the resin layer 3 is set to form a non-absorptive portion 5 (uncolored portion) by performing pattern exposure by utilizing a photomask 4, on the resin layer in advance at a portion light-shielded by the black matrix 2 (FIG. 4C). Then, the resin layer 3 is colored with respective R, G and B colors by the ink-jet head (FIG. 4D), and the ink is dried in accordance with necessity.

In the pattern exposure, a photomask 4 having openings for curing the light-shielded portions by the black matrix 2 is employed. At this time, to prevent occurrence of uncolored portion at a portion which abuts on the black matrix 2, it is necessary to apply a relatively large amount of ink to such portion. For this purpose, the photomask 4 have openings greater than the width (light-shielding width) of the black matrix 2.

As the ink used for coloring, dyes and pigments are both available, and further, both liquid ink and solid ink are available.

As curable resin composition employed in the present invention, any composition can be used as long as it has ink acceptability, and it can be set by at least one of irradiation of light and heating. For example, resins such as acrylic resins, epoxy resins, silicone resins, cellulose derivatives such as hydroxypropyl cellulose, hydroxyethyl cellulose, methylcellulose, carboxymethyl cellulose or degenerated materials thereof can be employed.

To advance cross-linking reaction by light, or light and heat, a photo-initiator (cross-linking agent) can be employed. As the cross-linking agent, bichromate, bisazide, radical initiator, cationic initiator, anionic initiator and the like can be employed. Further, these photo-initiators can be mixed or they can be combined with other sensitizers. Moreover, a photooxide generator, such as onium salt or the like, may be used in combination as the cross-linking agent. To further advance the cross-linking reaction, heating processing can be performed after irradiation of light.

The resin layer including the above compositions has excellent thermal resistance and water resistance so as to sufficiently endure high temperature post-process or cleaning process.

As the ink-jet method used in the present invention, a bubble-jet type method using electrothermal transducer as an energy generating element, or a piezo-jet type method using a piezoelectric element can be employed. The size of colored area and the coloring pattern can be arbitrarily set.

Moreover, although the present embodiment shows an example where the black matrix is formed on the substrate, the black matrix may be formed on the resin layer after the curable resin composition layer is formed or after coloring is performed, and the form thereof is not limited to that of the present embodiment. Further, for the forming method of the black matrix, it is preferable that a metal thin film is formed on a substrate by sputtering or deposition method and patterning is performed by photolithography process. However, the forming method is not limited to this.

Figure 4F:
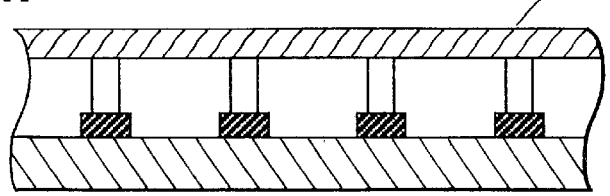

Next, the resin composition is set by irradiation of light only, or heating processing only, or irradiation of light and heating processing (FIG. 4E), and a protective layer 8 is formed in accordance with necessity (FIG. 4F). Note that in FIGS. 4A to 4F, sign hv denotes the intensity of light. In case of heating processing, the resin layer is set by heat instead of light of the intensity hv. The protective layer 8 is formed by using a second resin composition of photo-setting type, heat-setting type or photo- and heat-setting type, or by vapor deposition or sputtering using inorganic material. Any material can be used to form the protective layer 8 as long as it has transparency and sufficient durability at ITO formation process, orientation film formation process and the like performed thereafter.

FIGS. 5 to 7 are cross sectional views showing the basic structure of a color liquid crystal display apparatus 30 incorporating the above-described color filter.

Generally, the color liquid-crystal display device is formed by assembling the color filter substrate 1 and an opposing substrate 21 and filling liquid crystal compound 18 between them. On the inner surface of the substrate 21, a TFT (Thin Film Transistor) (not shown) and transparent pixel electrodes 20 are formed in matrix. On the inner surface of the substrate 1, the color filter 54 is provided such that the R, G and B coloring portions can be positioned corresponding to each of the pixel electrodes. A transparent counter electrode (common electrode) 16 is formed on the entire surface of the color filter 54. Generally, the black matrix 2 is formed on the side of the color filter substrate 1 (see FIG. 5). However, in a case of a BM (black matrix) on array type liquid crystal panel, the black matrix 2 is formed on the side of the TFT substrate opposing to the color filter substrate (see FIG. 6). Further, an orientation film 19 is formed on the surfaces of the both substrates 1 and 21. Liquid-crystal molecules can be oriented in a uniform direction by rubbing processing on the orientation film 19. Further, polarizing plates 11 and 22 are attached to the outer surfaces of the respective glass substrates. The liquid crystal compound 18 is filled in the joint clearance (about 2 to 5 $\mu$m) between these glass substrates. As a backlight, the combination of a fluorescent light (not shown) and a light-scattering plate (not shown) is generally used. The liquid-crystal compound functions as an optical shutter to change transmissivity of the backlight, which realizes display.

Furthermore, as shown in FIG. 7, a coloring portion may be formed on the pixel electrodes 20 and may be made to serve as a color filter. In other words, the coloring portion constructing the color filter is not limited to being formed on the glass substrate. Note that the form shown in FIG. 7 includes a case where an ink-accepting layer is formed on the pixel electrodes and ink is discharged on the ink-receiving layer, and a case where resinous ink, into which coloring material is mixed, is directly discharged to the pixel electrodes.

A case where the above liquid crystal display device is applied to an information processing apparatus will be described below with reference to FIGS. 8 to 10.

FIG. 8 is a block diagram showing the schematic arrangement of an information processing apparatus serving as a word processor, a personal computer, a facsimile apparatus, and a copying machine, to which the above liquid crystal display device is applied.

Referring to FIG. 8, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader unit 1807, and the like on the display screen; 1803, a transparent, pressure-sensitive touch panel mounted on the display unit 1802. By pressing the surface of the touch panel 1803 with a finger or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. Electric signals from the FM sound source unit 1804 are converted into audible sound by a speaker unit 1805. A printer unit 1806 is used as an output terminal for a word processor, a personal computer, a facsimile apparatus, and a copying machine.

Reference numeral 1807 denotes an image reader unit for photoelectrically reading original data. The image reader unit 1807 is arranged midway along the original convey passage and designed to read originals for facsimile and copy operations, or other various originals.

Reference numeral 1808 denotes a transmission/reception unit for the facsimile (FAX) apparatus. The transmission/reception unit 1808 transmits original data read by the image reader unit 1807 by facsimile, and receives and decodes facsimile signals. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs for the user, and the like.

Figure 9:
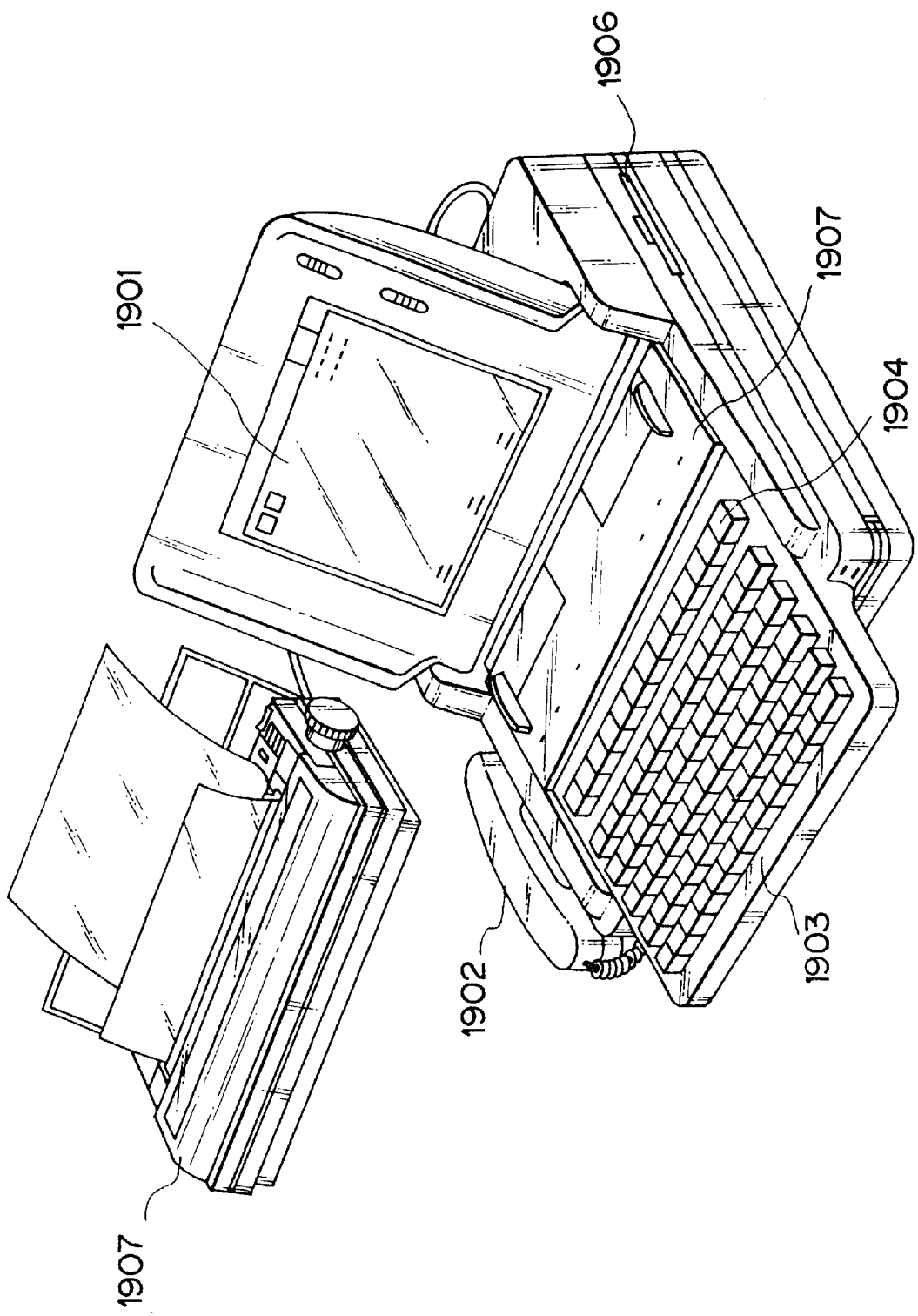
FIG. 9 is a perspective view of the information processing apparatus, to which the liquid crystal display device is applied.

FIG. 9 is a perspective view of the information processing apparatus in FIG. 8.

Referring to FIG. 9, reference numeral 1901 denotes a flat panel display using the above liquid crystal display device, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original insertion table on which an original to be read by the image reader unit 1807 is placed. The read original is discharged from the rear portion of the apparatus. In a facsimile receiving operation or the like, received data is printed by an ink-jet printer 1907.

In a case where the above information processing apparatus serves as a personal computer or a word processor, various kinds of information input through the keyboard unit 1811 are processed by the control unit 1801 in accordance with a predetermined program, and the resultant information is output, as an image, to the printer unit 1806.

In a case where the information processing apparatus serves as a receiver of the facsimile apparatus, facsimile information input through the transmission/reception unit 1808 via a communication line is subjected to reception processing in the control unit 1801 in accordance with a predetermined program, and the resultant information is outputted, as a received image, to the printer unit 1806.

In a case where the information processing apparatus serves as a copying machine, an original is read by the image reader unit 1807, and the read original data is output, as an image to be copied, to the printer unit 1806 via the control unit 1801. Note that in a case where the information processing apparatus serves as a transmitter of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 10:
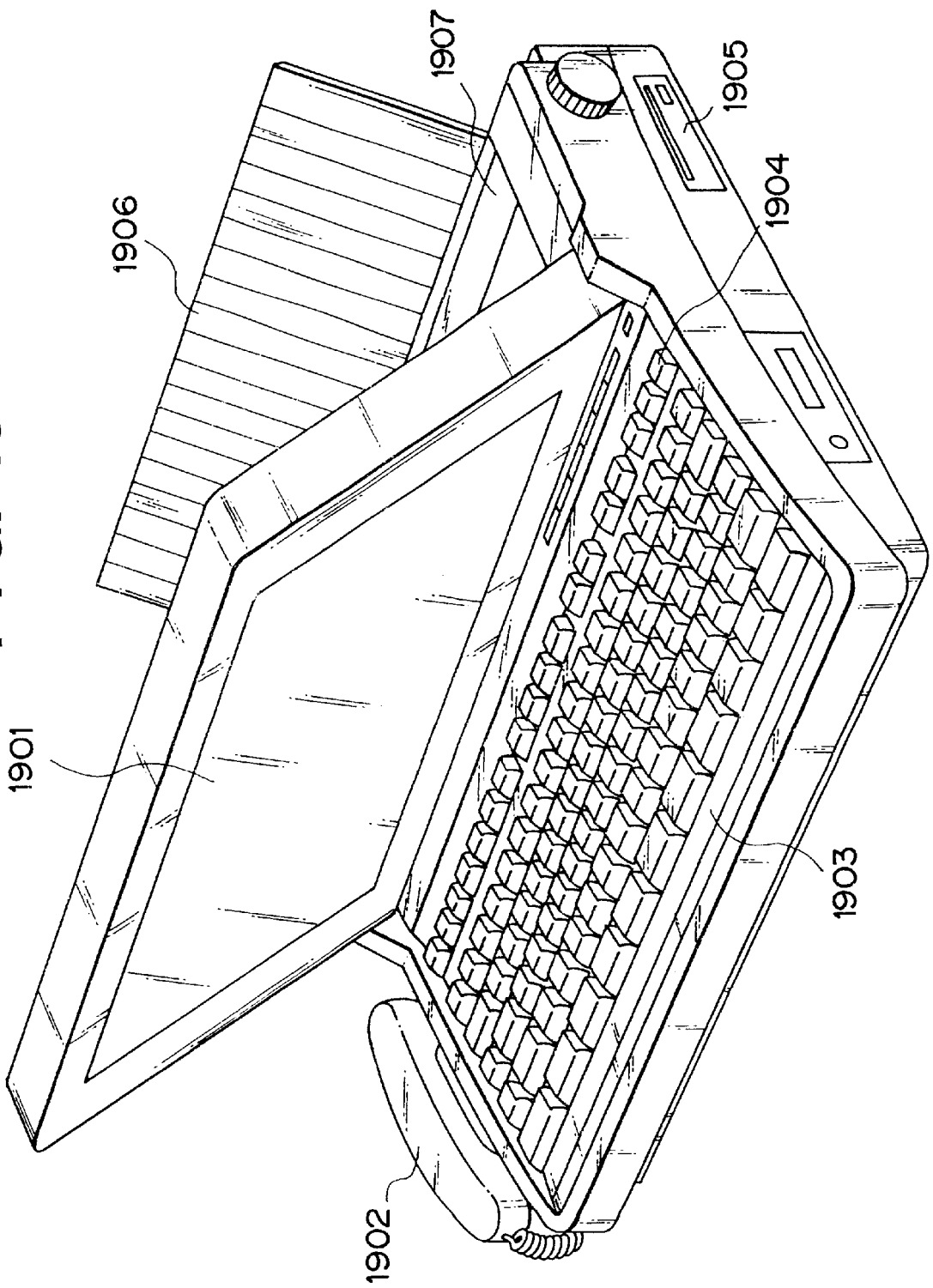
FIG. 10 is a perspective view of the information processing apparatus, to which the liquid crystal display device is applied.

Note that the above information processing apparatus may be designed as an integrated apparatus incorporating an ink-jet printer in the main body, as shown in FIG. 10. In this case, the portability of the apparatus can be improved. The reference numerals in FIG. 10 denote parts having the same functions as those in FIG. 9.

Figure 11:
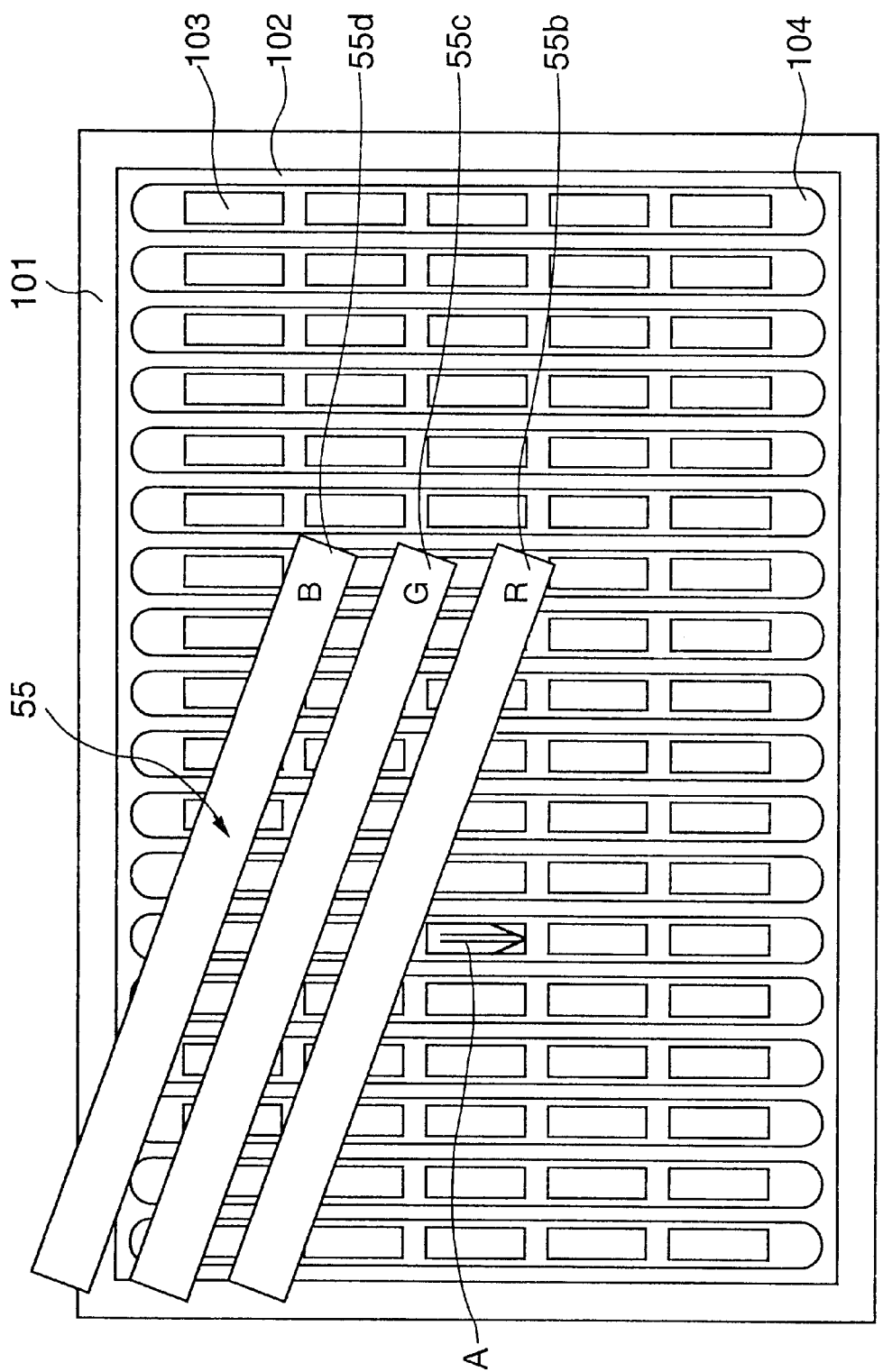
FIG. 11 is an explanatory view showing the method of coloring a color filter.

FIG. 11 is an explanatory view showing the method of coloring a color filter. FIG. 11 shows a top view of one of the plurality of color filters placed on the substrate shown in FIG. 1.

Figure 12:
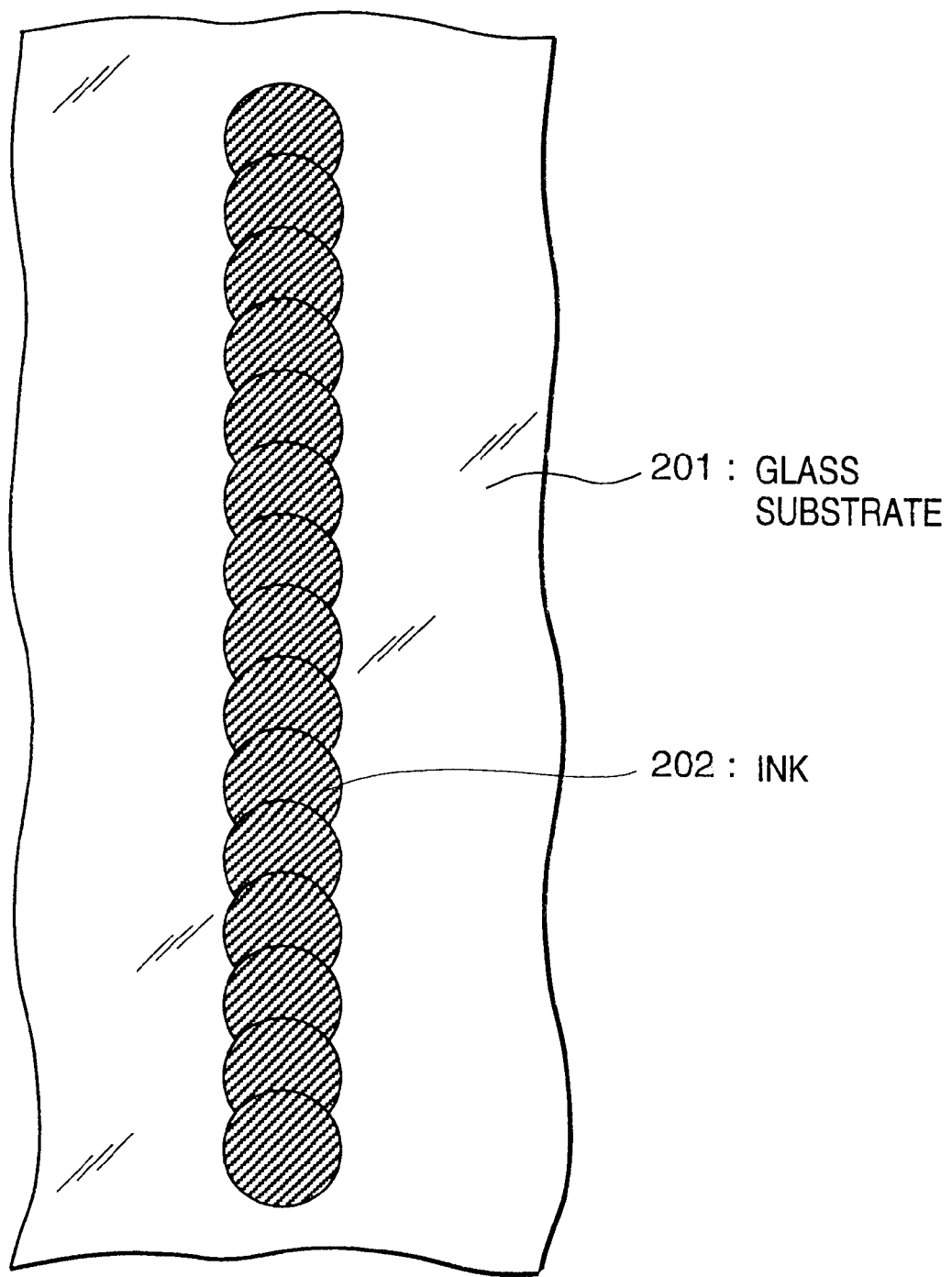
FIG. 12 is an explanatory view showing a coloring portion of the color filter immediately after being colored.

Each component in FIG. 11 is now described from the bottom layer of the color filter. Reference numeral 101 denotes a color filter substrate (corresponding to the substrate 1 in FIG. 4); and 102, a black matrix for shielding light (corresponding to the black matrix 2 in FIG. 4), formed on the color filter substrate 101. Reference numeral 103 denotes an opening portion (corresponding to the light-transmitting portion 7 in FIG. 4) provided on the black matrix 102. On the black matrix 102, an ink-accepting layer (corresponding to the resin layer 3 in FIG. 4) is formed and colored with ink. On the ink-accepting layer, stripes of water repellent portions (corresponding to the uncolored portion 5 in FIG. 4) are formed by ultraviolet rays between the horizontally adjacent opening portions of the black matrix 102. Reference numeral 104 denotes a coloring portion of the ink-accepting layer. Ink is discharged on the ink-accepting layer and mixed together as shown in FIG. 12, and spread to the range of the coloring portion 104 shown in FIG. 11. Reference numeral 55 denotes an ink-jet head unit for coloring a color filter, which includes ink-jet heads 55b, 55c and 55d for respective colors (red R, green G, blue B). Each of the ink-jet heads 55b, 55c and 55d comprises a plurality of nozzles (not shown) in the longitudinal direction of the head, and is provided at an angle on the plane parallel to the substrate 101, so that the nozzle pitch coincides with the pixel pitch. The ink-jet head unit 55 discharges ink while being scanned in the direction indicated by arrow A with relative to the substrate 101, thereby coloring each pixel array.

A color filter is experimentally manufactured by the above-described color-filter manufacturing apparatus, by intentionally including a factor which is a presumed cause of color unevenness. By examining whether or not color unevenness can be recognized in the manufactured color filter, the principle of occurrence of the color unevenness is determined.

The factors which presumably cause color unevenness are as follows:

(1) The average value of absorbance in each pixel fluctuates; and (2) Absorbance distribution in each pixel fluctuates.

Hereinafter, the average value of absorbance in one pixel is referred to as a color density.

Figure 16:
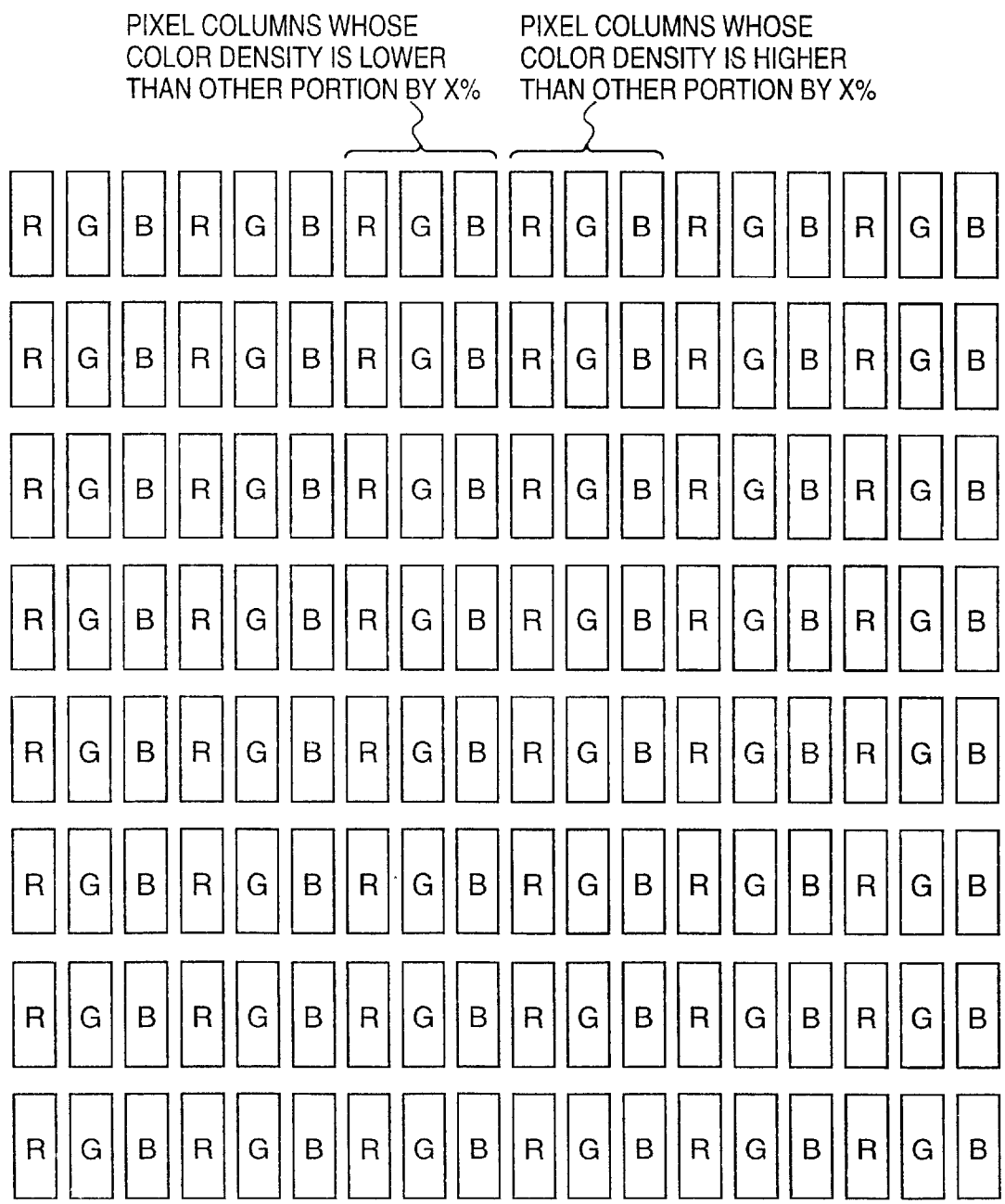
FIG. 16 is an explanatory view showing colored pixels whose density is partially changed.
Figure 17:
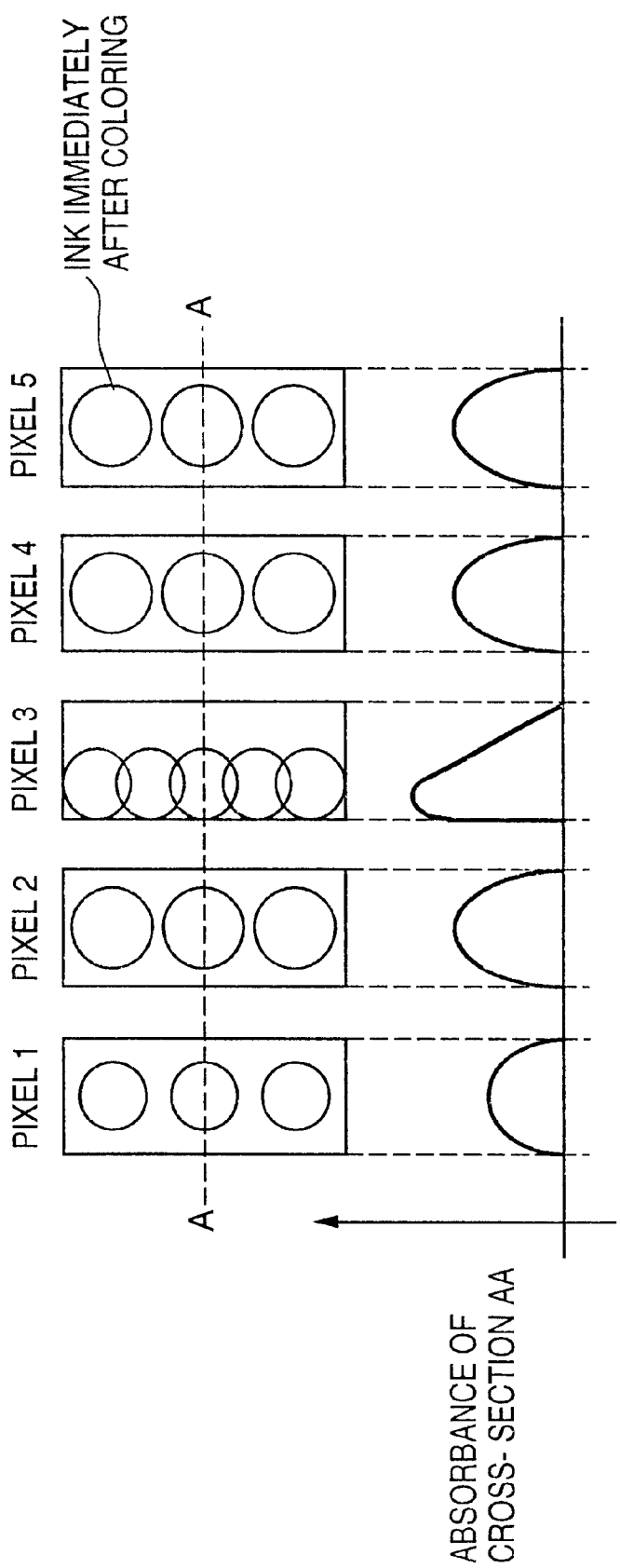
FIG. 17 is an explanatory view for explaining a cause in which color unevenness is viewed in a color filter.

On the manufactured color filter, 22 groups of pixels in the horizontal direction of the filter, one group including red, green and blue pixels, are colored, and in the vertical direction of the filter, areas corresponding to about 65 pixels are colored. Herein, the color density and ink discharge position are intentionally altered for two groups of pixels (one group being columns of red, green and blue pixels), which are in the central portion of the color filter in the horizontal direction (this portion will be referred to as the central pixel columns). FIG. 16 is an enlarged view of the central portion of the color filter. Each of the squares indicated as R, G or B is the pixel colored with red, green and blue.

Note that in order to rule out the influence of differences in ink discharge amount and ink discharge position of each nozzle, the coloring operation herein is performed by a single nozzle. Since a single nozzle can sustain uniform discharge operation only for a limited period of time, a small area is colored as described above.

With respect to the color density of the central pixel columns, the ink discharge interval is intentionally made longer than other portions, and by this, an amount of ink discharged per unit area is made smaller than other portions. Moreover, with respect to the unevenness of the ink discharge position, the positional relationship between the stage and head is altered so as to intentionally discharge ink on a position deviated to the right from the center of the opening portion of the black matrix.

The result of the experiment is shown in FIGS. 13A to 13C.

Referring to the graphs in FIGS. 13A to 13C, the abscissa indicates a deviation of ink discharged position in the central pixel columns, and the ordinate indicates the color density in the central pixel columns expressed as a percentage (corresponding to X in FIG. 16) when compared to the other portions of the color filter. The area indicated as "OK region" in FIGS. 13A to 13C is the area where a color filter with no color unevenness or color mixture is obtained.

As a result of the experiment, the following three conclusions are derived.

(1) Visibility of color unevenness is largely influenced by color density;
(2) Deviation of ink discharged position mainly causes color mixture (ink of different colors adjacent to each other being mixed), but does not have much influence on the color unevenness; and
(3) Marginal value of the color density fluctuation, which influences visibility of color unevenness, differs for each color.

Accordingly, a color filter with no color unevenness can be realized by controlling the color density fluctuation for each color.

Referring to FIGS. 13A to 13C, the boundary between the OK region and NG region indicates the margin where a specialist operator becomes unable to determine unevenness of the color filter under the condition where unevenness is most easily recognized (a dark room with single-color lights turned on for the entire room). Practically, some color unevenness is tolerable. In view of the results of experiments under the environment where normal usage state is assumed, a margin of color density fluctuation, in which color unevenness is invisible in practical sense, is obtained for each color.

Note that for evaluation of the color density, it is relevant to use, not the minimum or maximum values, but a standard deviation, because of the following two reasons:

(1) Unlike the foregoing experiment where color density fluctuation is intentionally created, an actually manufactured color filter has color density fluctuation close to the normal distribution; and
(2) In a case where color densities of few pixels are more prominent than other pixel portions, these pixels are recognized as defective pixels, e.g., bright points or dark points, and not recognized as color unevenness.

Thus, in the present specification, the standard deviation of the distribution of average values of absorbance in each pixel with respect to the entire surface of the filter is referred to as a color density fluctuation.

The color density fluctuation, in which color unevenness is invisible in practical sense, obtained with the above conditions, is as follows.

red: 5% or less
green: 10% or less
blue: 3% or less

Accordingly, by keeping the density fluctuation of pixels lower than the above value with respect to each of the colors, it is possible to manufacture a color filter with practically no conspicuous color unevenness.

Herein, the color density (an average value of absorbance in one pixel) is measured by a measuring apparatus adopting a line-type CCD camera shown in FIG. 14. Absorbance of each pixel is obtained by dividing each pixel portion into about 3 $\mu$m-square, then an average value of the entire pixel is calculated.

Note that since the measurement is performed plural number of times, disturbance generated at the time of measurement is removed, and the measurement precision with 1% or lower disturbance is attained.

In the above-described experiment, since the area of colored portion (screen size of color filter) is smaller than a general-purpose color filter used for a personal computer or the like, there was a concern in that the visibility of color unevenness may be different.

In view of the above concern, the color-filter manufacturing apparatus shown in FIG. 1 is used to examine variation of visibility of color unevenness when the screen size is changed.

The method used to examine the above is that a color filter having a diagonal size of 264 mm (10.4 inch)×307 mm (12.1 inch), which is widely used as a display of a personal computer, is manufactured while variously altering the ink amount fluctuation, and color density fluctuation in which color unevenness cannot be seen is obtained. Furthermore, the circumference of the color filter is partially covered so as to approximately create a color filter having various screen sizes. Then, the tolerable range of ink amount fluctuation is obtained with respect to the color filter having various screen sizes.

From the above experiment, the following results are obtained.

(1) In a case of a color filter having a diagonal size of 200 mm or less, the tolerable value of color density fluctuation, in which color unevenness cannot be seen, becomes smaller as the size of the screen becomes larger.
(2) In a case of a color filter having a diagonal size of 200 mm or more, the tolerable value of color density fluctuation, in which color unevenness cannot be seen, is hardly influenced by the size of the screen.
(3) In a case of the color filter having a diagonal size of 200 mm or more, the range of color density fluctuation, in which color unevenness is invisible in practical sense, is lower than the following values:

red: 2.5%
green: 6%
blue: 1.5%

The actually manufactured color filter has a diagonal length of 264 mm (10.4 inch) and 307 mm (12.1 inch), and stripes of colored portion, each including 400 pixels in vertical direction and 600 pixels in horizontal direction, are arrayed on the filter.

The ink-jet head used in the experiment includes 1408 nozzles. For coloring each color, every five nozzles, i.e. total of 207 nozzles, are used. In order to equalize the intervals of the nozzle pitch with that of the pixels, the printhead is provided at an angle on a plane parallel to the substrate.

Since the length of the ink-jet head was about ¼ of the horizontal length of the color filter, coloring operation was performed while dividing all the pixels into four areas from the left.

In each of the divided areas, the ink-jet head is scanned five times, and coloring one pixel is completed by five times of coloring. For each scanning, the stage is driven so that the head is shifted for a distance corresponding to 30 nozzles.

As for an actual coloring pattern, in order to equalize the amount of ink discharged per pixel per unit area, the ink discharge interval is controlled for each of the nozzles (called shading correction). Alternatively, instead of controlling the ink discharge intervals, the amount of ink discharged each time from a nozzle of the ink-jet head may be controlled (bit correction). Alternatively, the foregoing bit correction and shading correction may be combined.

Figure 18:
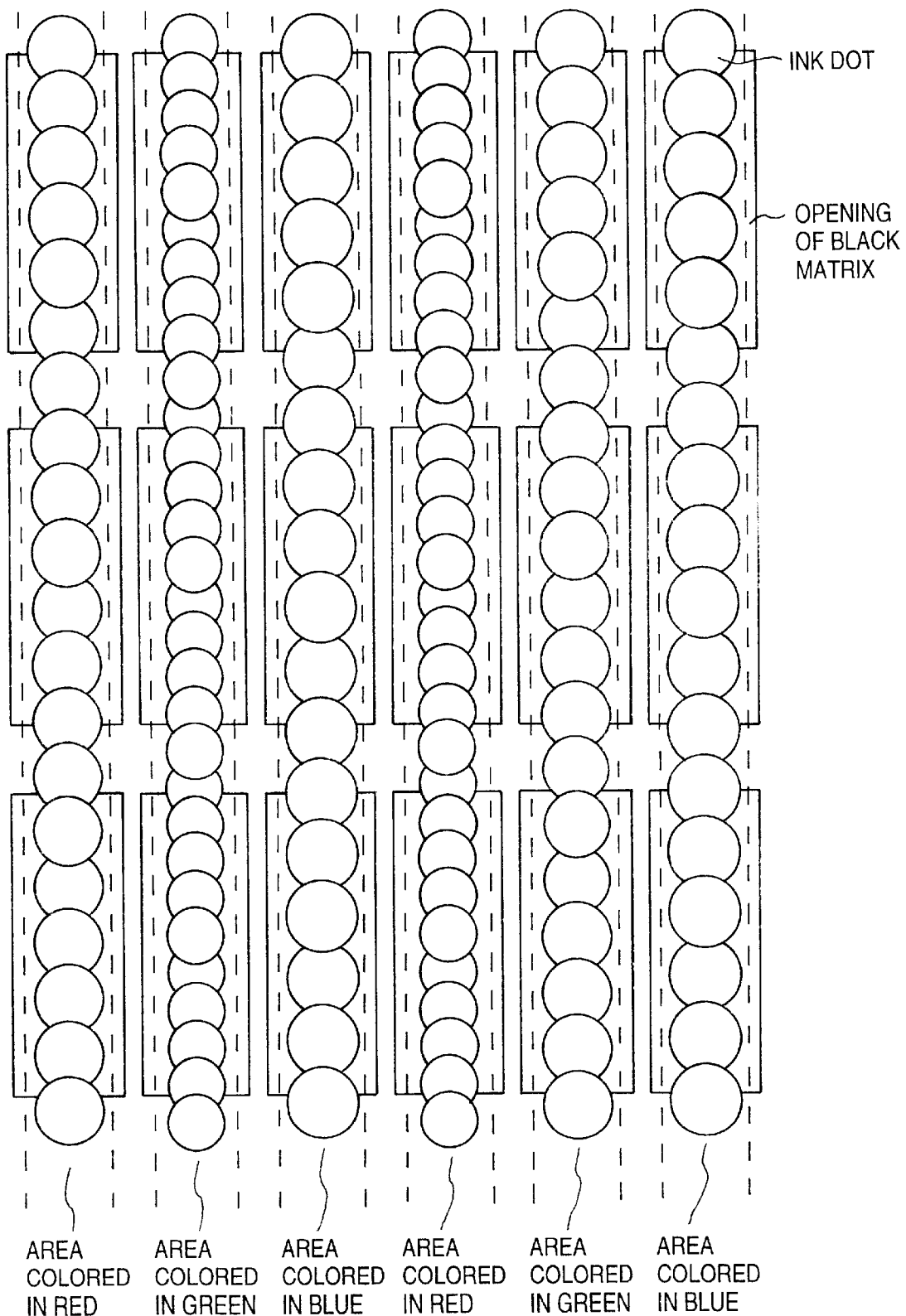
FIG. 18 is an explanatory view of a color filter immediately after coloring operation.

FIG. 18 shows a color filter immediately after coloring operation. In a case where an area including a plurality of pixels is colored without intermission as specifically shown in FIG. 18, shading correction enables to control, with high precision, the amount of ink discharged per unit area of a pixel in the area; thus, it is possible to keep the fluctuation of coloring density of each pixel equal to or lower than the fluctuation of the amount of ink discharged by each nozzle. Therefore, even if the fluctuation of the amount of ink discharged by each of the ink nozzles is larger than 3%, it is possible to keep the color density fluctuation among pixels of each color under 5% or lower in the case of red, 10% or lower in the case of green and 3% or lower in the case of blue. Note that the ink-jet head actually utilized for manufacturing the above-described color filter had a 15–20% fluctuation in the amount of ink discharged by each nozzle.

During this control, the amount of ink discharged by each nozzle was measured by the measuring apparatus shown in FIG. 14.

Referring to FIG. 14, reference numeral 501 denotes an image processing apparatus for measuring density; and 502, a personal computer (hereinafter referred to as PC) for controlling the image processing apparatus 501 and an XY control stage 504. Reference numeral 503 denotes an optical microscope; 504, an XY control stage for continuously moving an object subjected to measurement in the field of view of the microscope; 505, a CCD camera for capturing an image of the object subjected to measurement to be sent to the image processing apparatus; and 506, a transmission light source provided underneath the XY control stage 504. The central portion of the stage surface of the XY control stage 504 is made of glass so that the image of an object subjected to measurement can be sent to the color CCD camera 505 by using the light source 506. The PC 502 controls the XY control stage 504 and image processing apparatus 501.

Figure 15:
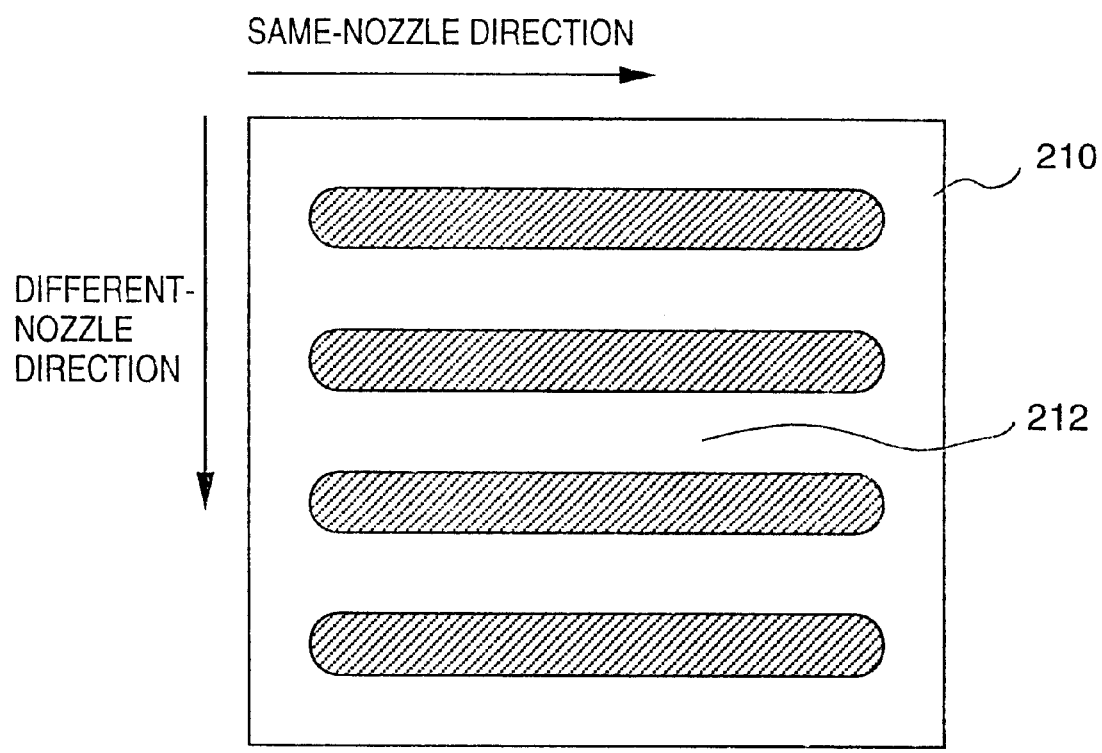
FIG. 15 is an explanatory view of a line pattern used for measuring ink discharge amount of a nozzle.

As a sample of measurement, a color filter substrate 210 shown in FIG. 15, where no black matrix is formed, is used. On the color filter substrate 210, an ink-accepting layer 212 which does not include a water repellent portion is formed, and a stripe pattern is colored with each color as similar to the color filter. Note that the same-nozzle direction and different-nozzle direction indicated in FIG. 15 mean respectively the line-pattern extended direction in which a line pattern colored by the same nozzle is extended, and the direction of arrangement of line patterns colored by different nozzles.

Hereinafter, the theory of measurement in the measuring system is described. It is concluded from the Lambert-Beer law that when a line pattern is divided into extremely small areas, an absorbance of one portion is proportional to the volume of ink absorbed in that portion. Therefore, by adding the absorbance with respect to the line pattern, it is possible to obtain a value proportional to the volume of ink absorbed in the line pattern. Accordingly, the amount of ink discharged by a nozzle to draw each line, or the amount of ink per unit area of each pixel of the color filter, can be obtained as a relative value of each nozzle or pixel.

Since the measurement result includes a random noise component, measurement is performed plural number of times, and the average value of the measured results is used for controlling the amount of ink per unit area. Therefore, as the number of times of measurement is altered, the color density fluctuation of each pixel changes. As the number of times of measurement is increased, the color density fluctuation of each pixel is reduced.

Herein, in order to keep the density fluctuation of colored pixel under the following values: red 2.5%; green 6%; and blue 1.5%, it is necessary to control the discharge amount by adjusting driving signals or the size of nozzle holes of an ink-jet head, or necessary to control the ink discharge intervals. To achieve a precision necessary for such control, in the present embodiment, measurement is performed six times. In other words, in the present embodiment, the operation of measuring density of the aforementioned line pattern and obtaining the ink discharge amount of each nozzle, is performed six times and the average value thereof is calculated. By this, precision of data necessary to control the density unevenness under the above-described values is achieved. As described above, without any limitation to the order of coloring operation as conventionally required, a color filter can be colored with no unevenness by simple discharge control of the ink-jet head.

It should be noted that since the density fluctuation of colored pixel, in which unevenness cannot be recognized, is different for each color, the above-described necessary measurement precision differs for each color. Although in the foregoing example, the number of times of measurement for three colors is the same as that of the color requiring the largest number of times of measurement (in the foregoing example, six times for blue), for a color besides the color requiring the largest number of times of measurement, a smaller number of times of measurement may be performed. In other words, the number of times of measurement may be altered for each color. In this case, a further advantage can be achieved that since the total number of times of measurement for three colors is reduced, the time required for manufacturing a color filter is also reduced.

In the present embodiment, as the process for altering, for each color, the number of times of repeated process included in the processing steps for adjusting the amount of ink per unit area of a pixel in a color filter, the number of times of measuring coloring density is altered for each color.

Note that as the means for measuring colored density, other well-known means for measuring color density may be used, e.g., spectral microscope or the like.

The density fluctuation in the colored portion also occurs due to the difference between the discharge amount of each nozzle at the time of measuring color density, and the discharge amount of the nozzle at the time of actually manufacturing a color filter. The difference increases in proportion to a frequency of discharge operation performed during the time of measuring color density and the time of manufacturing the color filter. Therefore, in a case where a number of color filters are manufactured until the difference of the discharge amount becomes larger than a tolerable value, the density fluctuation in the colored portion is measured again. Then, it is necessary to control the discharge amount or the ink discharge intervals by using the measured result.

Because the range of density fluctuation of colored pixel, in which unevenness cannot be recognized, is different for each color, the frequency of density fluctuation measurement and discharge amount control or ink discharge interval control is different for each color. Therefore, the density fluctuation measurement, discharge amount control or ink discharge interval control may be performed as frequently as required by a color most frequently necessitating these operations (normally, blue), for other colors. Alternatively, with respect to other colors, these control may be performed with less frequency. In this case, a further advantage can be achieved in that the time required for manufacturing a color filter is also reduced.

Hereinafter, description will be provided on the coloring operation according to the present embodiment, which is performed for a plurality of number of times.

Normally, density fluctuation in a colored portion is caused by measurement noise generated at the time of measuring the color density of a line pattern, or the difference between the discharge amount of each nozzle at the time of measuring color density and the discharge amount of the nozzle at the time of actually manufacturing a color filter. In view of this, inventors of the present invention examined the nature of these factors: measurement noise and the difference in discharge amount. As a result, the inventors discovered that these factors showed random behavior, and that the distribution of color density for each nozzle, on which color density adjustment had been performed, was almost normal.

Therefore, assuming a standard deviation of color density distribution for each nozzle is $\sigma$, in a case where one pixel is colored by n number of different nozzles, the standard deviation of color density distribution of each pixel is $\sigma/\sqrt{n}$ according to the central-limit theorem.

Similarly in the color filter according to the present embodiment, in a case where the color density fluctuation of each pixel is limited within the above range, color density fluctuation with respect to a single nozzle is approximately $\sqrt{n}$ (in this case, n=5) times the above value.

In other words, by completing coloring of each pixel with plural number of times (n times) of coloring, the density fluctuation of pixel can be controlled to $1/\sqrt{n}$ of the case of completing coloring of each pixel in a single time of coloring.

Note that as described in the present embodiment, such effort to minimize color density fluctuation generally causes decline in productivity, as exemplified by the increased number of times of measurement. On the other hand, when a color filter is actually manufactured, there are various disturbance factors generated in the process of manufacturing. For this reason, it is preferable to set a value as small as possible as a target value of color density fluctuation because it is more likely to achieve the above-described range of fluctuation, and as result, excellent yield is achieved. In other words, productivity and yield are achieved at the expense of the other.

In view of the above, it is necessary to determine a most appropriate value for the target value of color density fluctuation, taking the productivity and yield into consideration.

Note that the present invention is applicable to a corrected and modified case of the above-described embodiment without departing from the spirit of the present invention.

For instance, a display panel having a color filter in the side of TFT arrays is lately available. The color filter defined in the present specification is a substrate colored by coloring material. Therefore, the color filter according to the present embodiment includes both cases of being included in the side of TFT arrays or in the other side.

The embodiment described above has exemplified a printer, which comprises means (e.g., an electrothermal transducer, laser beam generator, and the like) for generating heat energy as energy utilized upon execution of ink discharge, and causes a change in state of ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558, 333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive ink from the apparatus main unit upon being mounted on the apparatus main unit, or a cartridge type printhead in which an ink tank is integrally arranged on the printhead itself, is applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in the above-mentioned embodiment of the present invention, it is assumed that the ink is liquid. Alternatively, the present invention may employ ink which is solid at room temperature or less, or ink which softens or liquefies at room temperature, or ink which liquefies upon application of a printing signal.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In this case, ink may be situated opposite to electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned ink.

As has been set forth above, according to the present invention, since there is no limitation in the order of coloring operation, a color filter can be manufactured in a short period of time with simple stage operation.

Moreover, since the range of most appropriate fluctuation is defined for each color, it is possible to pursue both manufacturing cost and quality of a color filter. For instance, as explained in the above embodiment, it is possible to achieve both low manufacturing cost and high quality in the case of a color-filter manufacturing apparatus where measurement is repeatedly performed and color density fluctuation is controlled in accordance with the number of times of the measurement, as compared to the case where the number of times of measurement is set for each color and the color density fluctuation is not controlled for each color.

The present invention is not limited to the above embodiments and various changes and modifications can be made within the spirit and scope of the present invention. Therefore, to appraise the public of the scope of the present invention, the following claims are made.

What is claimed is:

1. A color-filter manufacturing method for manufacturing a color filter by discharging at least a single color of red, green and blue ink, onto a color-subject material by using an ink-jet head, for coloring each pixel of the color-subject material, wherein coloring is performed such that color density fluctuation among pixels colored in red is kept 5% or lower, color density fluctuation among pixels colored in green is kept 10% or lower, and color density fluctuation among pixels colored in blue is kept 3% or lower, and wherein a method of adjusting the color density fluctuation is altered for each color in accordance with a prescribed color density fluctuation.

2. The color-filter manufacturing method according to claim 1, wherein fluctuation of an ink discharge amount per single discharge of an ink-discharge nozzle of the ink-jet head is larger than 3%.

3. The color-filter manufacturing method according to claim 2, wherein fluctuation of an ink discharge amount per single discharge of an ink-discharge nozzle of the ink-jet head is kept within 15% to 20%.

4. The color-filter manufacturing method according to claim 1, wherein the method of adjusting the color density fluctuation includes altering the number of times a repeated process is used for each color so as to adjust the color density fluctuation within the range of the prescribed color density fluctuation, the repeated process including discharging ink, measuring color density, and altering the amount of ink per unit area of a pixel in the color filter in accordance with the measurement result.

5. The color-filter manufacturing method according to claim 1, wherein frequency of performing the process of adjusting the color density fluctuation is altered for each color in accordance with the prescribed color density fluctuation.

6. The color-filter manufacturing method according to claim 1, wherein in a case where coloring each pixel is completed in n (n is a positive integer) times of coloring, coloring is performed such that a value of color density fluctuation among pixels colored each time is kept no more than $\sqrt{n}$ multiple of 5% in a case of a red pixel, no more than $\sqrt{n}$ multiple of 10% in a case of a green pixel, and no more than $\sqrt{n}$ multiple of 3% in a case of a blue pixel.

7. The color-filter manufacturing method according to claim 1, wherein coloring is performed such that fluctuation of an ink amount per unit area in a colored portion of the color-subject material is kept 5% or lower in a case of a red pixel, 10% or lower in a case of a green pixel and 3% or lower in a case of a blue pixel.

8. The color-filter manufacturing method according to claim 1, wherein in a case the color-subject material is a substrate having a diagonal size of 200 mm or more, coloring is performed such that color density fluctuation among pixels colored in red is kept 2.5% or lower, color density fluctuation among pixels colored in green is kept 6% or lower, and color density fluctuation among pixels colored in blue is kept 1.5% or lower.

9. The color-filter manufacturing method according to claim 8, wherein in a case where coloring each pixel is completed in n (n is a positive integer) times of coloring, coloring is performed such that a value of color density fluctuation among pixels colored each time is kept no more than $\sqrt{n}$ multiple of 2.5% in a case of a red pixel, no more than $\sqrt{n}$ multiple of 6% in a case of a green pixel, and no more than $\sqrt{n}$ multiple of 1.5% in a case of a blue pixel.

10. The color-filter manufacturing method according to claim 8, wherein coloring is performed such that fluctuation of an ink amount per unit area in a colored portion of the color-subject material is kept 2.5% or lower in a case of a red pixel, 6% or lower in a case of a green pixel and 1.5% or lower in a case of a blue pixel.

11. The color-filter manufacturing method according to claim 1, wherein the ink-jet head is a printhead for discharging ink by utilizing heat energy, and includes heat energy transducers for generating heat energy to be applied to the ink.

12. A color-filter manufacturing method for coloring a color-subject material, by measuring color density of the color-subject material, while changing the number of times of measurement or frequency of measurement in accordance with a color of a pixel, and by using the result of measurement, coloring is performed such that color density fluctuation among pixels colored in red is kept 5% or lower, color density fluctuation among pixels colored in green is kept 10% or lower, and color density fluctuation among pixels colored in blue is kept 3% or lower.

13. The color-filter manufacturing method according to claim 12, wherein an amount of ink discharged per single discharge of a nozzle of an ink-jet head is adjusted based on the result of measurement of color density.

14. The color-filter manufacturing method according to claim 13, wherein the number of times of adjusting an amount of ink per unit area of a pixel in the color filter is altered for each color in accordance with the result of measurement of density performed for each color.

15. The color-filter manufacturing method according to claim 13, wherein frequency of performing processing for adjusting an amount of ink per unit area of a pixel in the color filter is altered for each color in accordance with the result of measurement of density performed for each color.

16. The color-filter manufacturing method according to claim 12, wherein in a case the color-subject material is a substrate having a diagonal size of 200 mm or more, coloring is performed such that color density fluctuation among pixels colored in red is kept 2.5% or lower, color density fluctuation among pixels colored in green is kept 6% or lower, and color density fluctuation among pixels colored in blue is kept 1.5% or lower.

17. A color-filter manufacturing method for coloring a color-subject material, by measuring color density of the color-subject material, while changing the number of times of measurement or frequency of measurement in accordance with a color of a pixel, and by using the result of measurement, coloring is performed such that fluctuation of an ink amount per unit area in a colored portion of the color-subject material is kept 5% or lower in a case of a red pixel, 10% or lower in a case of a green pixel and 3% or lower in a case of a blue pixel.

18. The color-filter manufacturing method according to claim 17, wherein the number of ink dots discharged by an ink-jet head per unit area in a colored portion of the color-subject material is adjusted based on the measurement result of color density.

19. The color-filter manufacturing method according to claim 18, wherein the number of times of adjusting an amount of ink per unit area of a pixel in the color filter is altered for each color in accordance with the result of measurement of density performed for each color.

20. The color-filter manufacturing method according to claim 17, wherein in a case the color-subject material is a substrate having a diagonal size of 200 mm or more, coloring is performed such that fluctuation of an ink amount per unit area among pixels colored in red is kept 2.5% or lower, fluctuation of an ink amount per unit area among pixels colored in green is kept 6% or lower, and fluctuation of an ink amount per unit area among pixels colored in blue is kept 1.5% or lower.

21. A color-filter manufacturing method for manufacturing a color filter by discharging at least a single color of red, green and blue ink, onto a color-subject material by using an ink-jet head, for coloring each pixel of the color-subject material,
wherein coloring is performed such that color density fluctuation among pixels colored in red is kept 5% or lower, color density fluctuation among pixels colored in green is kept 10% or lower, and color density fluctuation among pixels colored in blue is kept 3% or lower, and
wherein in a case where coloring each pixel is completed in n (n is a positive integer) times of coloring, coloring is performed such that a value of color density fluctuation among pixels colored each time is kept no more than $\sqrt{n}$ multiple of 5% in a case of a red pixel, no more than $\sqrt{n}$ multiple of 10% in a case of a green pixel, and no more than $\sqrt{n}$ multiple of 3% in a case of a blue pixel.

22. The color-filter manufacturing method according to claim 21, wherein fluctuation of an ink discharge amount per single discharge of an ink-discharge nozzle of the ink-jet head is larger than 3%.

23. The color-filter manufacturing method according to claim 21, wherein fluctuation of an ink discharge amount per single discharge of an ink-discharge nozzle of the ink-jet head is kept within 15% to 20%.

24. The color-filter manufacturing method according to claim 21, wherein the ink-jet head is a printhead for discharging ink by utilizing heat energy, and includes heat energy transducers for generating heat energy to be applied to the ink.

25. A color-filter manufacturing method for manufacturing a color filter by discharging at least a single color of red, green and blue ink, onto a color-subject material by using an ink-jet head, for coloring each pixel of the color-subject material,
wherein coloring is performed such that color density fluctuation among pixels colored in red is kept 5% or lower, color density fluctuation among pixels colored in green is kept 10% or lower, and color density fluctuation among pixels colored in blue is kept 3% or lower,
and wherein in a case where coloring each pixel is completed in n (n is a positive integer) times of coloring, coloring is performed such that a value of color density fluctuation among pixels colored each time is kept no more than $\sqrt{n}$ multiple of 2.5% in a case of a red pixel, no more than $\sqrt{n}$ multiple of 6% in a case of a green pixel, and no more than $\sqrt{n}$ multiple of 1.5% in a case of a blue pixel.

26. The color-filter manufacturing method according to claim 25, wherein fluctuation of an ink discharge amount per single discharge of an ink-discharge nozzle of the ink-jet head is larger than 3%.

27. The color-filter manufacturing method according to claim 25, wherein fluctuation of an ink discharge amount per single discharge of an ink-discharge nozzle of the ink-jet head is kept within 15% to 20%.

28. The color-filter manufacturing method according to claim 25, wherein the ink-jet head is a printhead for discharging ink by utilizing heat energy, and includes heat energy transducers for generating heat energy to be applied to the ink.

* * * * *

UNITED STATES PATENT AND TRADEMARK OFFICE
CERTIFICATE OF CORRECTION

PATENT NO. : 6,329,108 B1
DATED : December 11, 2001
INVENTOR(S) : Hiroshi Fujiike et al.

Page 1 of 1

It is certified that error appears in the above-identified patent and that said Letters Patent is hereby corrected as shown below:

Drawings,
Sheets 13, 14 and 15, "CENTARL" should read -- CENTRAL --.

Column 7,
Line 34, "hv" should read -- h$v$ --.
Line 36, "hv." should read -- h$v$. --.
Line 44, "cross sectional" should read -- cross-sectional --.

Signed and Sealed this

Twenty-first Day of May, 2002

Attest:

JAMES E. ROGAN
*Director of the United States Patent and Trademark Office*

*Attesting Officer*